United States Patent
Yokose et al.

(10) Patent No.: US 7,420,483 B2
(45) Date of Patent: Sep. 2, 2008

(54) DATA PROCESSING APPARATUS, DATA PROCESSING METHOD, COMPUTER READABLE MEDIUM STORING PROGRAM, AND COMPUTER DATA SIGNAL

(75) Inventors: Taro Yokose, Ashigarakami-gun (JP); Ikken So, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/594,056

(22) Filed: Nov. 8, 2006

(65) Prior Publication Data

US 2007/0229325 A1   Oct. 4, 2007

(30) Foreign Application Priority Data

Apr. 3, 2006 (JP) .............................. 2006-102023

(51) Int. Cl.
*H03M 7/34* (2006.01)

(52) U.S. Cl. .......................................... 341/51; 341/50

(58) Field of Classification Search .................... 341/50, 341/51

See application file for complete search history.

(56) References Cited

U.S. PATENT DOCUMENTS 5,890,150 A * 3/1999 Ushijima et al. ............... 707/3

FOREIGN PATENT DOCUMENTS

JP 02001001576 A * 1/2001
JP A 2002-232721 8/2002

* cited by examiner

*Primary Examiner*—Jean B Jeanglaude
(74) *Attorney, Agent, or Firm*—Oliff & Berridge, PLC

(57) ABSTRACT

A data processing apparatus includes: an intermediate data generating unit that generates intermediate data expressing input data, which is a subject to be coded, in another expression manner; a coding unit that converts the intermediate data generated by the intermediate data generating unit into code data; and a code quantity evaluating unit that evaluates a code quantity of the code data generated by the coding unit on the basis of a statistical amount of the intermediate data generated by the intermediate data generating unit.

9 Claims, 19 Drawing Sheets

CODING PROGRAM 52

FIG.1
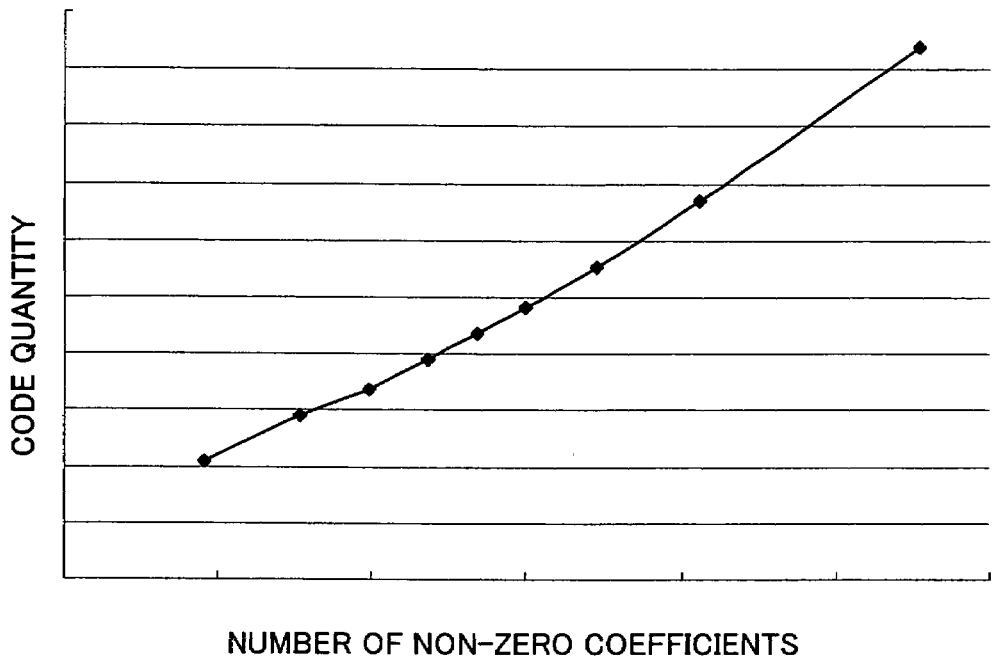
NUMBER OF NON-ZERO COEFFICIENTS
(A) TRANSFORM CODING SCHEME
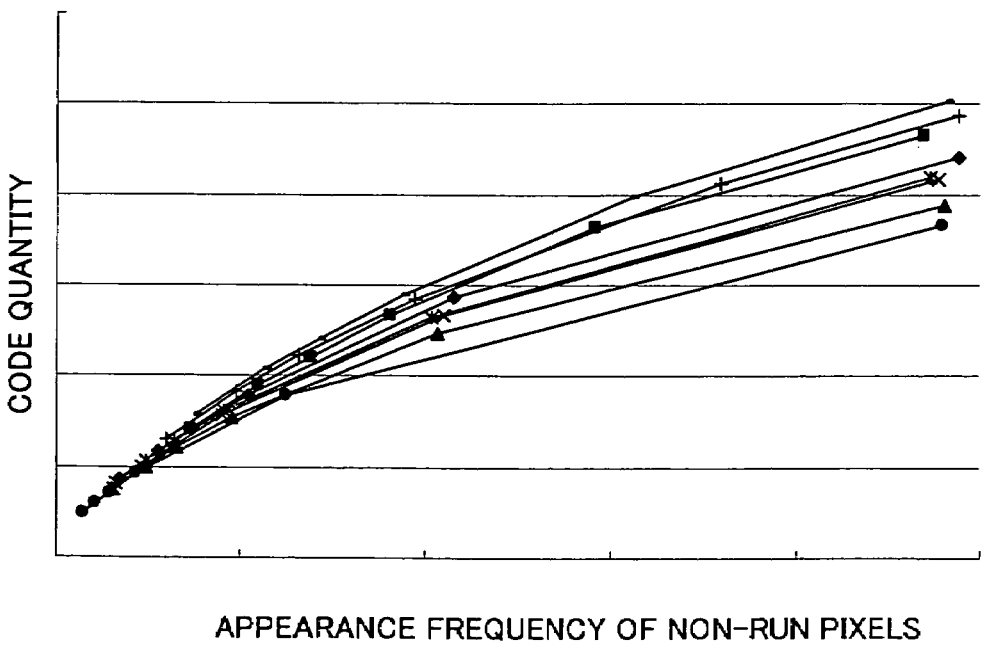
APPEARANCE FREQUENCY OF NON-RUN PIXELS
(B) PREDICTIVE CODING SCHEME

DATA PROCESSING APPARATUS 2

FIG.4

FOR BRIGHTNESS:

DC COMPONENT →

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

← MAXIMUM FREQUENCY COMPONENT

FOR COLOR DIFFERENCE:

DC COMPONENT →

| 17 | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

← MAXIMUM FREQUENCY COMPONENT

| SF | COEFFICIENT AFTER QUANTIZATION | | | | | | | |
|---|---|---|---|---|---|---|---|---|
| | 0 | 1 | 2 | 3 | 4 | 5 | 6 | 7 |
| 250/50 | 15476 | 555 | 117 | 67 | 54 | 49 | 35 | 15 |
| 50/50 | 13700 | 1344 | 432 | 242 | 126 | 80 | 65 | 42 |
| 10/50 | 10842 | 2105 | 748 | 438 | 342 | 214 | 186 | 144 |

(A) RESULT OF EXPERIMENT (B) QUANTIZATION INTERVAL

FIG.7
QUANTIZATION COEFFICIENT
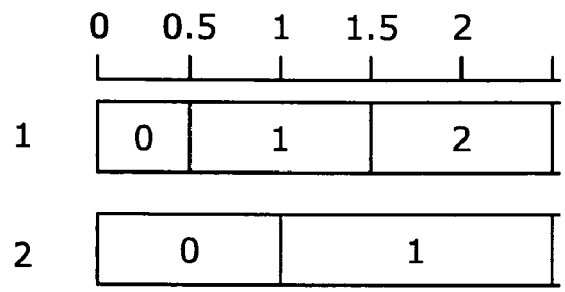
(A) QUANTIZATION INTERVAL
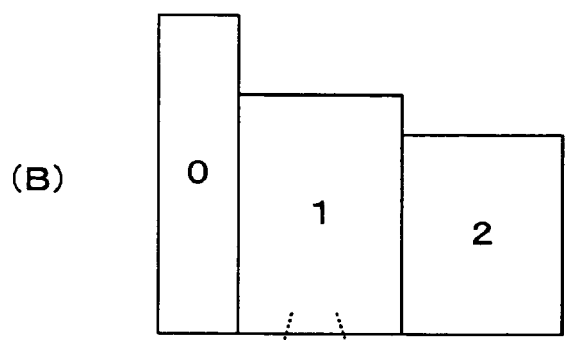
(B)
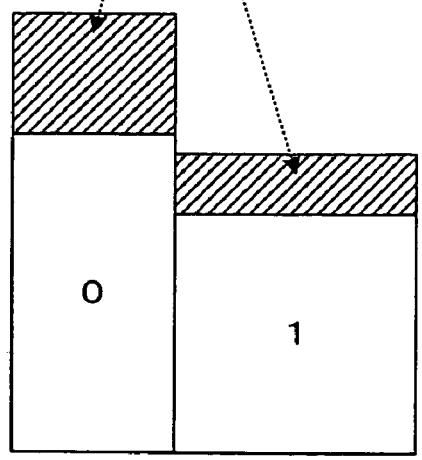
(C)

FIG.16
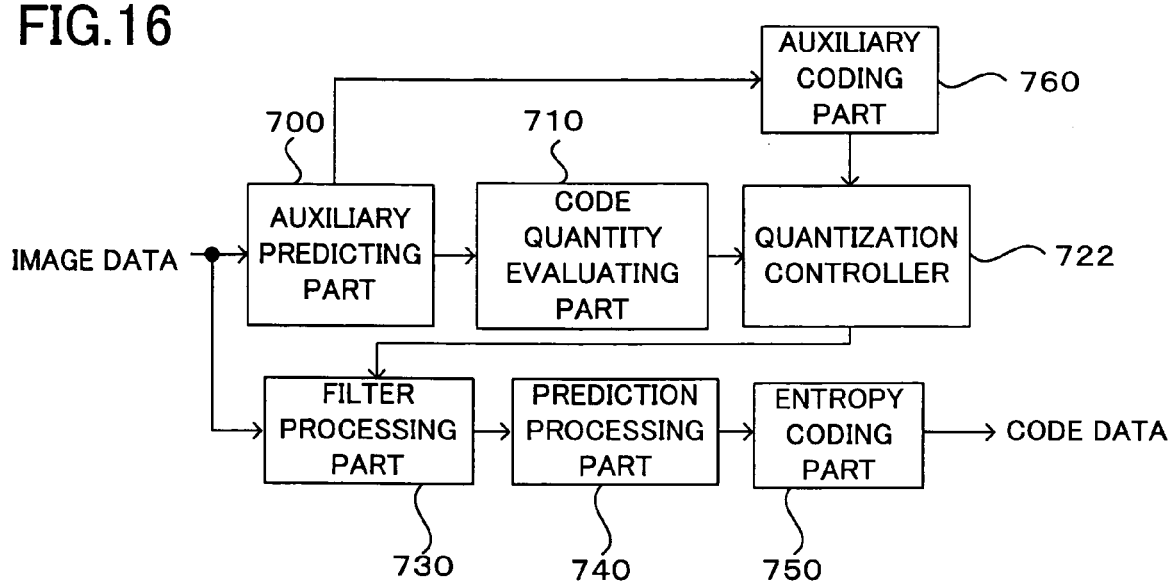
(A) CODING PROGRAM 72
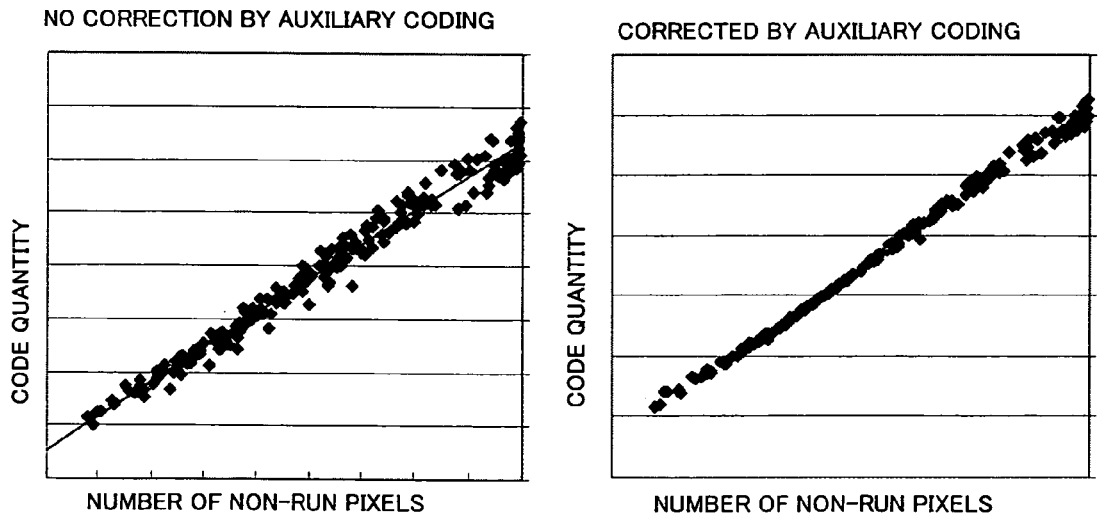
(B) RESULT OF EXPERIMENT (A) CODING PROGRAM 74

| CODING PARAMETER | APPROXIMATE EQUATION |
|---|---|
| PARAMETER A | APPROXIMATE EQUATION A |
| PARAMETER B | APPROXIMATE EQUATION B |
| ... | ... |

(B) APPROXIMATE EQUATION TABLE 772

S24

DATA PROCESSING APPARATUS, DATA PROCESSING METHOD, COMPUTER READABLE MEDIUM STORING PROGRAM, AND COMPUTER DATA SIGNAL

BACKGROUND

1. Technical Field

The present invention relates to a data processing apparatus, a data processing method, a computer readable medium storing a program, and a computer data signal.

2. Related Art

For example, a method is disclosed in which a relational expression of a code quantity and a quantization parameter is used to estimate a quantization parameter for every region in such a manner that the code quantity becomes not more than a prescribed quantity.

SUMMARY

According to an aspect of the present invention, a data processing apparatus includes an intermediate data generating unit that generates intermediate data expressing input data, which is a subject to be coded, in another expression manner; a coding unit that converts the intermediate data generated by the intermediate data generating unit into code data; and a code quantity evaluating unit that evaluates a code quantity of the code data generated by the coding unit on the basis of a statistical amount of the intermediate data generated by the intermediate data generating unit.

BRIEF DESCRIPTION OF THE DRAWINGS

Exemplary embodiments of the present invention will be described in detail based on the following figures, wherein:

FIG. 1(A) is a graph showing a relationship between a number of non-zero coefficients and code quantity;

FIG. 1(B) is a graph showing a relationship between an appearance frequency of non-run pixels and code quantity;

FIG. 4 is a diagram illustrating a quantization table used in a quantizing part 510;

FIGS. 7(A) to 7(C) are diagrams for explaining a method of estimating the distribution of the transformed coefficient when the scaling factor is an even multiple;

FIG. 16(A) illustrates a functional configuration of a coding program 72 in a first modified example;

FIG. 16(B) is a diagram illustrating the result of the experiment;

DETAILED DESCRIPTION

Figure 2:
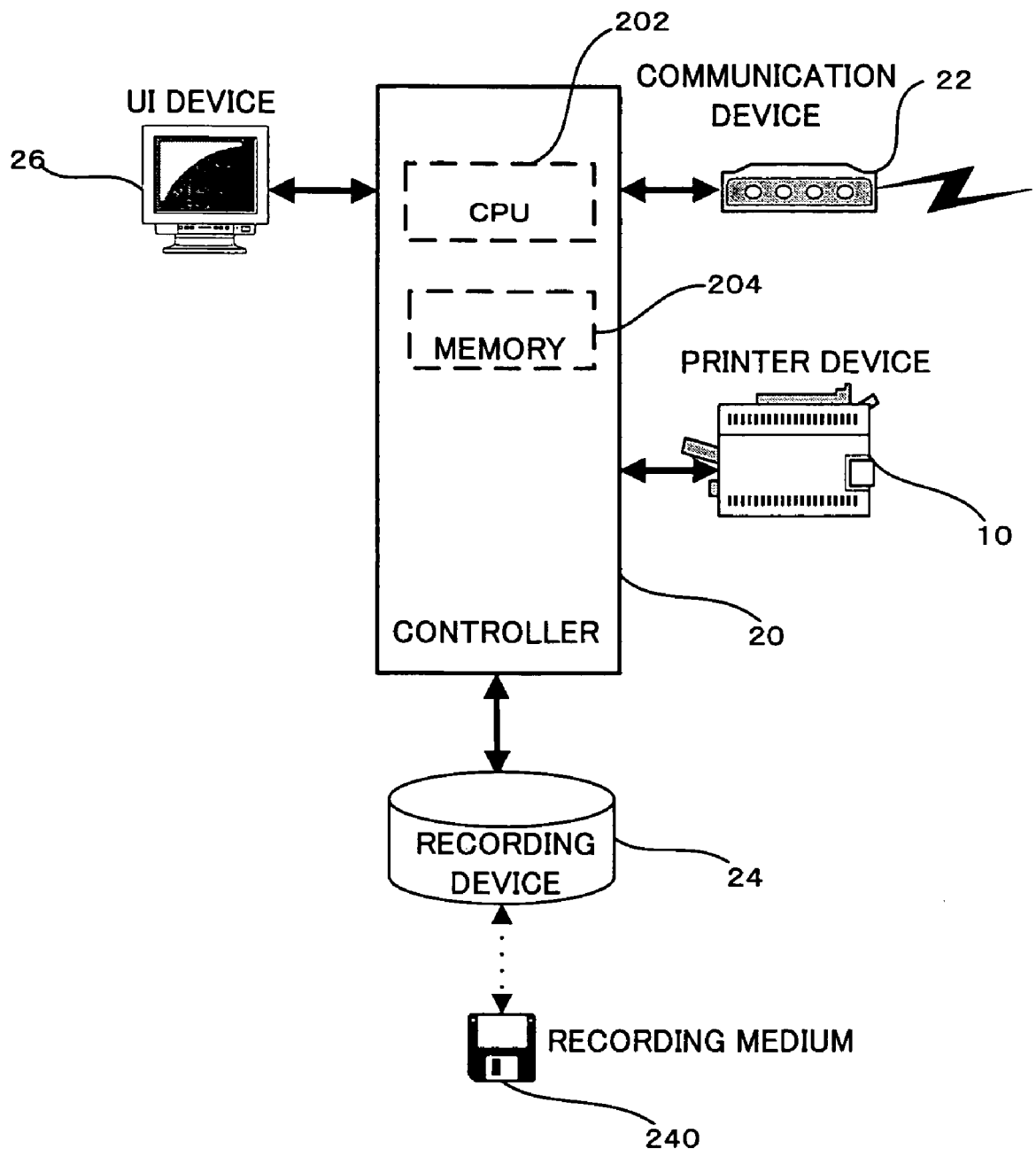
FIG. 2 is a diagram for illustrating a hardware configuration, mainly a controller 20, of a data processing apparatus 2 to which an image processing method according to an aspect of the present invention is applied.

The background and outline of the invention will be firstly explained for assisting the understanding of the invention.

A coding process is realized by a source coder that converts input data into intermediate data and an entropy coder that converts the intermediate data into code data. The code quantity is a quantity of output data from the entropy coder.

There may be the case in which the code quantity is limited to be not more than a fixed value. However, since a lossless coding process has a limitation on a compression rate, a lossy coding scheme (e.g., JPEG) using a quantizing process has been used.

The lossy coding system is to enhance coding efficiency by changing input data or intermediate data lossily to reduce the quantity of information. However, the lossy coding process (e.g., quantizing process) described above entails deterioration in data (e.g., deterioration in image quality).

Therefore, in order to realize a desired compression rate while minimizing the deterioration in image, it is required to search a necessary and sufficient lossy process by evaluating code quantity when the lossy process such as the quantizing process is not performed or when a predetermined lossy process is executed. For example, a quantization parameter that specifies the degree of the quantizing process is determined cut-and-try, while evaluating the data quantity of the actual code data.

However, the entropy coder provides bit-by-bit process. Therefore, a process load is generally heavy. Accordingly, if the code quantity can be estimated before the process of the entropy-coder, the process load can be reduced by eliminating the unnecessary process of the entropy coder.

The entropy coder is designed on the basis of the statistical amount. Therefore, if one knows appropriate statistical amount for the intermediate data (i.e., output from the source coder) inputted to the entropy coder, one can estimate the final code quantity.

In view of this, a data processing apparatus 2 according to an exemplary embodiment of the invention evaluates code quantity on the basis of intermediate data generated by a source coder, and performs data processing according to the result of the evaluation.

In this exemplary embodiment, a coding process according to the result of the evaluation of the code quantity will be explained.

A JPEG scheme will be explained as an example of transform coding.

The JPEG scheme employs two-dimensional Huffman coding to the entropy coder. The two-dimensional Huffman coding has two functions. One function is Huffman-coding of non-zero coefficients (DCT coefficients having a value other than zero) and the other is run-length coding of zero coefficients (DCT coefficients having a value of zero). Accordingly, it is predicted that the code quantity of the code data generated by the JPEG scheme depends upon the number of the non-zero coefficient.

FIG. 1(A) is a graph indicating the relationship between the number of the non-zero coefficient and code quantity.

In the graph shown in FIG. 1(A), measured values when the quantization parameter (scaling factor) for the same image is changed are plotted.

As shown in FIG. 1(A), it is found that the code quantity is changed in general proportion to the number of the non-zero coefficient.

When the transform coding is used, the data processing apparatus 2 calculates, among the transformed coefficients (intermediate data), the statistical value (total number, probability of appearance, or the like) of the number of the non-zero coefficient, and evaluates the code quantity on the basis of the calculated statistical value.

In order to count the number of the non-zero coefficient, the intermediate data string is stored in a memory. Since this process is generally carried out for optimizing the entropy coding, it does not become a special overhead. For example, in the JPEG scheme, the string of the transformed coefficient is accumulated in the memory, and the Huffman code is optimally designed on the basis of its statistical amount, in order to optimize the Huffman code.

Further, the code quantity can similarly be evaluated also in the predictive coding.

Specifically, in a simple run-length coding or a coding using a run length such as LZ coding, among predictive coding schemes, it is considered that how much of run is not got, i.e., which degree the prediction is inaccurate affects the code quantity.

In the case of the coding scheme having plural prediction methods, for example, it is considered that the number of non-run pixels (the pixel in which all predictions are inaccurate) affects the code quantity.

FIG. 1(B) is a graph indicating the relationship between the appearance frequency of non-run pixels and code quantity.

In the graph shown in FIG. 1(B), the measured values when the quantization parameter (resolution parameter) for images of eight types is changed are plotted.

Although there are quantitative differences (difference in the vertical direction) in the code quantity depending upon the image, a strong correlation is established in the same image as shown in FIG. 1(B).

When the predictive coding scheme is used, the data processing apparatus 2 calculates the appearance frequency of the inaccurate prediction from the agreement information of the input data and prediction data, and evaluates the code quantity on the basis of the calculated appearance frequency of inaccurate prediction.

In the transform coding scheme such as JPEG system, the code quantity is controlled by using the quantizing process (lossy process) of the transformed coefficient, while in the predictive coding scheme, the quantization effect is obtained by increasing the allowable difference upon the prediction or filling a pixel value with a spatial filter.

The entropy coding in the predictive coding scheme performs a process with two units. Specifically, the entropy coding includes (1) a process with a unit of one pixel of a non-run pixel and (2) a process with a run-unit of a run pixel. In this exemplary embodiment, the code quantity is evaluated by considering the dominant (1), but the code quantity may be evaluated by also using the number (not the run length) of the run for considering (2).

A specific example in which an aspect of the present invention is applied to the transform coding scheme will be explained in the first exemplary embodiment, and the specific example in which an aspect of the present invention is applied to the predictive coding scheme will be explained in the second exemplary embodiment.

[Hardware Configuration]

Subsequently, a hardware configuration of the data processing apparatus 2 of the exemplary embodiment will be explained.

FIG. 2 is a diagram illustrating a hardware configuration of the data processing apparatus 2, mainly a controller 20, to which the data processing method according to an aspect of the present invention is applied.

As illustrated in FIG. 2, the data processing apparatus 2 is composed of a controller 20 including a CPU 202, a memory 204 and the like; a communication device 22; a recording device 24 such as an HDD/CD device; and a user interface device (UI device) 26 including LCD display or CRT display and keyboard or touch panel.

The data processing apparatus 2 is provided in a printer device 10. It obtains image data through the communication device 22 or the recording device 24, and codes the obtained image data.

[Coding Program]

Figure 3:
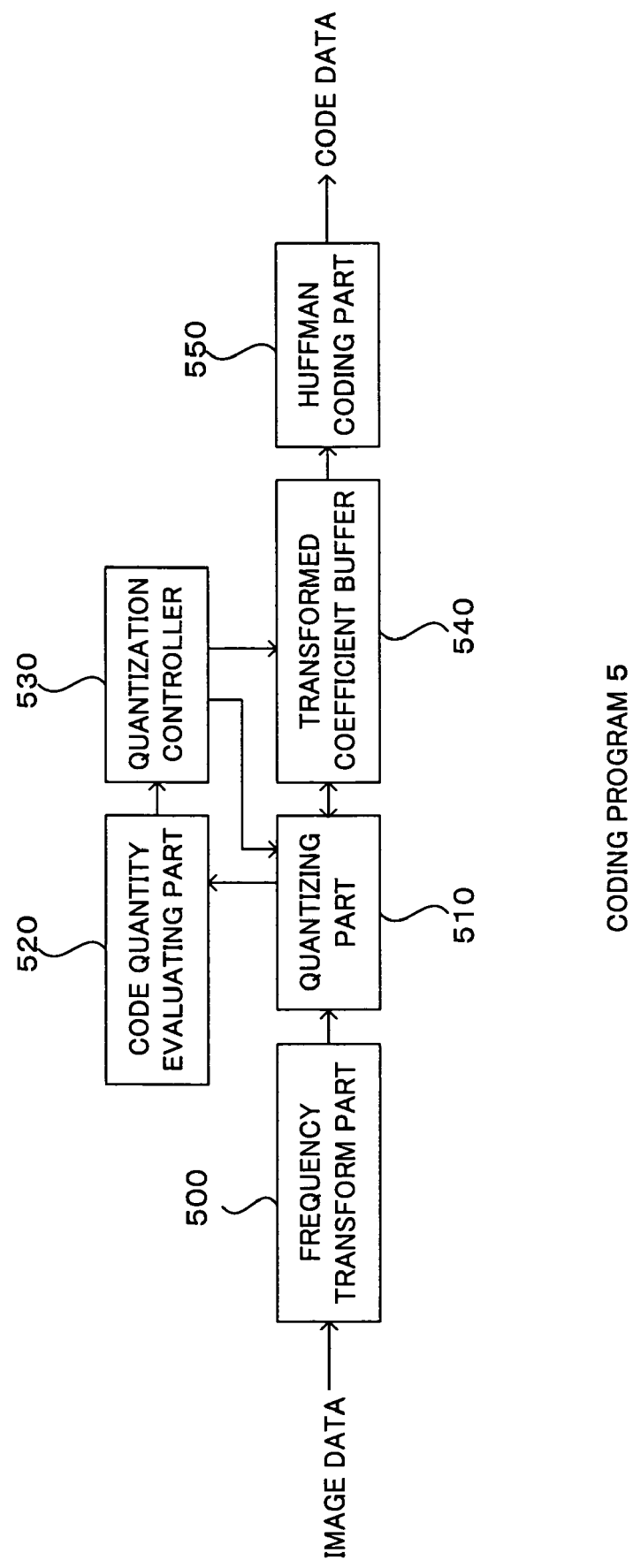
FIG. 3 is a diagram illustrating a functional configuration of a coding program 5 executed by the controller 20 (FIG. 2) and realizing a data processing method according to an aspect of the invention.

FIG. 3 is a diagram illustrating a functional configuration of a coding program 5 that is executed by the controller 20 (FIG. 2) and realizes the data processing method according to an aspect of the present invention.

As illustrated in FIG. 2, the coding program 5 has a frequency transform part 500, a quantizing part 510, a code quantity evaluating part 520, a quantization controller 530, a transformed coefficient buffer 540, and a Huffman coding part 550.

In the coding program 5, the frequency transform part 500 performs a transformation process to the inputted image data (input data) to generate a coefficient (transformed coefficient) of each frequency. The generated transformed coefficient is one example of intermediate data.

The frequency transform part 500 in this exemplary embodiment performs discrete cosine transformation (DCT) to the inputted image data to generate a DCT coefficient of 8×8.

The quantizing part 510 performs a quantizing process to the transformed coefficient generated by the frequency transform part 500.

The quantizing part 510 in this example quantizes the DCT coefficient of 8×8 by using a quantization table illustrated in FIG. 4. More specifically, the quantizing part 510 divides the DCT coefficient of 8×8 by the corresponding quantization coefficient in the quantization table (FIG. 4), and assumes the quotient as the DCT coefficient after the quantization.

The code quantity evaluating part 520 evaluates the code quantity on the basis of the transformed coefficient generated by the frequency transform part 500 or the transformed coefficient quantized by the quantizing part 510.

More specifically, the code quantity evaluating part 520 in this example calculates the statistical value (total number of the non-zero coefficient, probability of appearance, or the like) of the number of the transformed coefficient (non-zero coefficient) having a value other than zero among the transformed coefficients, and estimates the code quantity on the basis of the calculated statistical value.

The code quantity evaluating part 520 counts the number of non-zero coefficient, among the generated DCT coefficients, and calculates the code quantity corresponding to the number of the non-zero coefficient by using the approximate equation of the graph shown in FIG. 1(A).

Further, the code quantity evaluating part 520 in this example calculates the number of non-zero coefficient corresponding to the desired code quantity by using the approximate equation of the graph shown in FIG. 1(A).

The quantization controller 530 controls the quantization process by the quantizing part 510 on the basis of the result of the evaluation of the code quantity by the code quantity evaluating part 520.

When the code quantity estimated by the code quantity evaluating part 520 is not more than the desired code quantity, the quantization controller 530 in this example instructs the transformed coefficient buffer 540 to Huffman-encode the transformed coefficient with no alteration, and when the estimated code quantity exceeds the desired code quantity, it instructs the quantizing part 510 to re-quantize the transformed coefficient.

When the number of the non-zero coefficient to the desired code quantity is calculated by the code quantity evaluating part 520, the quantization controller 530 in this example determines the quantization parameter that realizes the calculated number of the non-zero coefficient, and sets the determined quantization parameter to the quantizing part 510. More specifically, the quantization controller 530 in this example calculates a scaling factor for realizing the number of the non-zero coefficient corresponding to the desired code quantity.

The transformed coefficient buffer 540 holds the transformed coefficient (DCT coefficient) inputted from the quantizing part 510, and outputs the held transformed coefficient to the Huffman coding part 550 in accordance with the instruction from the quantization controller 530.

The Huffman coding part 550 encodes the transformed coefficient (DCT coefficient) inputted from the transformed coefficient buffer 540 with Huffman coding.

FIG. 4 is a diagram illustrating the quantization table used by the quantizing part 510.

As illustrated in FIG. 4, the quantization coefficient varies depending upon the position of the block of 8×8. Specifically, the quantization table illustrated in this figure is a recommended quantization table in which the quantization coefficient at the higher frequency region is greater than that at the lower frequency region (e.g., DC component) in order to roughen the quantization at the higher frequency region.

The quantizing part 510 in this example multiplies each coefficient in the quantization table illustrated in FIG. 4 by the scaling factor set by the quantization controller 530 to determine the quantization coefficient that should be applied to each DCT coefficient, and divides each DCT coefficient by the determined each quantization coefficient.

Figure 5:
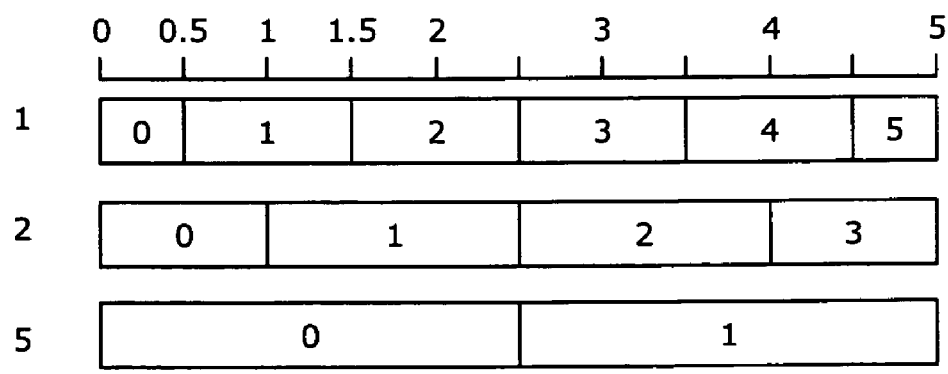
FIG. 5(A) shows a distribution of transformed coefficients when quantization is done with various scaling factors.
FIG. 5(B) is a diagram illustrating quantizer step sizes corresponding to each of various quantization coefficients.

FIG. 5(A) shows a distribution of the transformed coefficient when the quantization is made with various scaling factors, and FIG. 5(B) is a diagram illustrating quantization intervals corresponding to various quantization coefficients.

As the scaling factor (SF in the figure) increases (i.e., as the quantization interval increases), the distribution of the transformed coefficient after the quantization moves toward zero.

Comparing SF=10/50 and SF=50/50, for example, the quantization coefficient of SF=50/50 is five time greater than that of SF=10/50, whereby the transformed coefficient present from 0 to 2 in the case of the scaling factor being 10/50 is quantized to 0 when the scaling factor becomes 50/50. Strictly speaking, an error may sometimes be included, since it is necessary to represent the quantization table by an integer.

It is apparent from the quantization interval illustrated in FIG. 5(B).

As described above, the code quantity evaluating part 520 can estimate the distribution (i.e., number of non-zero coefficient, or code quantity) of the transformed coefficient obtained by the quantization of higher compression on the basis of the result (distribution of the transformed coefficient) of the quantization of lower compression.

Further, it is desirable that the code quantity evaluating part 520 evaluates the code quantity of the quantization interval that is an odd multiple of the reference quantization interval (in this embodiment, scaling factor).

As illustrated in FIG. 5(B), even if the quantization coefficient changes by one, the round-up or round-down threshold value changes only by 0.5. Therefore, even if the quantization coefficient doubles, the value after the quantization is not always ½. For example, the transformed coefficient of 1.2 becomes 1 after being quantized, even if the quantization coefficient is 1 or 2. In other words, it cannot be estimated that each transformed coefficient (0.5 to 1.5) included in the quantization section of 1 when the quantization coefficient is 1 is to be included in the quantization section of 0 or quantization section of 1 after being quantized with the quantization coefficient 2.

Accordingly, the code quantity evaluating part 520 estimates the code quantity (distribution of the transformed coefficient, or the number of non-zero coefficient) of the case of an odd multiple of the quantization coefficient, whereby the more highly precise estimation may be realized.

[Overall Operation]

Subsequently, the overall operation of the data processing apparatus 2 (coding program 5) will be explained.

Figure 6:
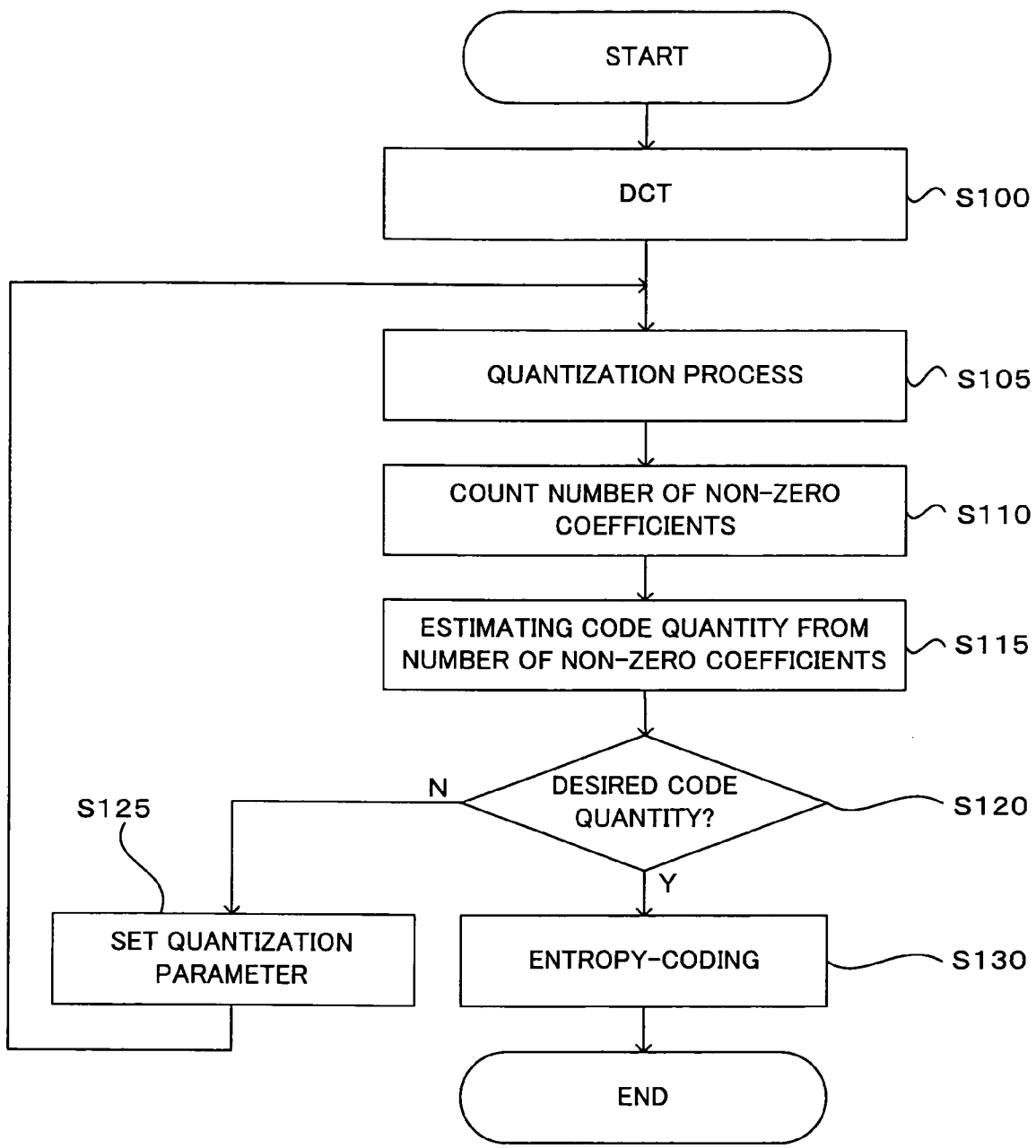
FIG. 6 is a flowchart of a coding process (S10) by the coding program 5 (FIG. 3)

FIG. 6 is a flowchart of a coding process (S10) by the coding program 5 (FIG. 3).

As shown in FIG. 6, at step 100 (S100), when image data is externally inputted, the frequency transform part 500 (FIG. 3) divides the inputted image data into image blocks of 8×8, provides a discrete cosine transformation (DCT) to each of the divided blocks to generate the DCT coefficients of the blocks of 8×8, and outputs the generated DCT coefficients to the quantizing part 510.

At step 105 (S105), the quantizing part 510 calculates the quantization coefficient based upon the scaling factor (SF) set by the quantization controller 530, quantizes the DCT coefficients inputted from the frequency transform part 500 by using the calculated quantization coefficient, and outputs the quantized DCT coefficients to the code quantity evaluating part 520 and transformed coefficient buffer 540.

It is to be noted that the quantization controller 530 sets the minimum SF as the initial value for the first quantization process to the inputted image data.

At step 110 (S110), the code quantity evaluating part 520 creates a histogram of the DCT coefficients (after the quantization) inputted from the quantizing part 510.

At step 115 (S115), the code quantity evaluating part 520 calculates the code quantity (estimated code quantity) corresponding to the number of the non-zero coefficient by using the approximate equation of the graph shown in FIG. 1(A), and outputs the calculated code quantity to the quantization controller 530.

At step 120 (S120), when the code quantity (estimated code quantity) calculated by the code quantity evaluating part 520 is not more than the desired code quantity, the coding program 5 moves to the process at S130, and when the calculated code quantity exceeds the desired code quantity, it moves to the process at S125.

At step 125 (S125), the code quantity evaluating part 520 calculates the number (target value) of the non-zero coefficient corresponding to the desired code quantity by using the approximate equation of the graph shown in FIG. 1(A), and outputs the calculated number of the non-zero coefficient and the histogram of the DCT coefficient to the quantization controller 530.

The quantization controller 530 determines the scaling factor, which should be applied, on the basis of the number (target value) of the non-zero coefficient and the histogram of the DCT coefficient inputted from the code quantity evaluating part 520, and sets the determined scaling factor to the quantizing part 510.

The coding program 5 returns to the process at S105, wherein it quantizes the DCT coefficient by using the newly set scaling factor and estimates the code quantity on the basis of the DCT coefficient after the quantization.

At step 130 (S130), when the estimated code quantity is not more than the desired code quantity, the quantization controller 530 instructs the transformed coefficient buffer 540 to output the DCT coefficient.

The transformed coefficient buffer 540 outputs the DCT coefficient (the latest DCT coefficient) inputted from the quantizing part 510 to the Huffman coding part 550.

The Huffman coding part 550 encodes the DCT coefficient inputted from the transformed coefficient buffer 540 with Huffman code, and outputs the resultant to the outside.

Although the number (target value) of the non-zero coefficient corresponding to the desired code quantity is calculated, and the scaling factor according to the target value of the calculated non-zero coefficient is determined in this example, the invention is not limited thereto. For example, the coding program 5 may increase the scaling factor in accordance with the specified rule until the estimated code quantity becomes not more than the desired code quantity.

As explained above, the data processing apparatus 2 according to the exemplary embodiment can estimate a code quantity based upon the distribution of transformed coefficients.

Accordingly, the data processing apparatus 2 can control the desired code quantity without repeating Huffman coding process.

MODIFIED EXAMPLE 1

A modified example of the exemplary embodiment will be explained.

In the exemplary embodiment described above, the distribution of the transformed coefficient is estimated with high precision by varying the scaling factor with only the odd multiple thereof, but the invention is not limited thereto. For example, the distribution of the transformed coefficient of an even multiple or real number multiple of the scaling factor may be estimated.

FIGS. 7(A) to 7(C) are diagrams for explaining a method of estimating the distribution of the transformed coefficients with an even multiple of the scaling factor.

As illustrated in FIG. 7(A), upon an even multiple or real number multiple of the scaling factor, the boundary between the quantization sections by a new scaling factor does not coincide with the original boundary between the quantization sections. Therefore, it cannot be estimated which quantization section the transformed coefficient belonging to the original quantization section is to be incorporated by the quantization with a new scaling factor.

In view of this, when there is the original quantization section (quantization section 1 in FIG. 7(B)) overlapping with the new boundary between the quantization sections, the code quantity evaluating part 520 in this modified example distributes the number of the transformed coefficients included in this quantization section to the new quantization section as illustrated in FIG. 7(C).

Specifically, the code quantity evaluating part 520 continuously interpolates the frequency value, not the discrete value, and then, calculates the frequency value of the new quantization section. It is to be noted that a multi-dimensional interpolation, spline interpolation, or the like may be employed as the continuous interpolation, in addition to a linear interpolation.

MODIFIED EXAMPLE 2

In the exemplary embodiment described above, a single quantizing part 510 is provided. On the other hand, in the modified example 2, two quantizing units (first quantizing unit 512 and second quantizing unit 514) are provided as illustrated in FIG. 8.

Figure 8:
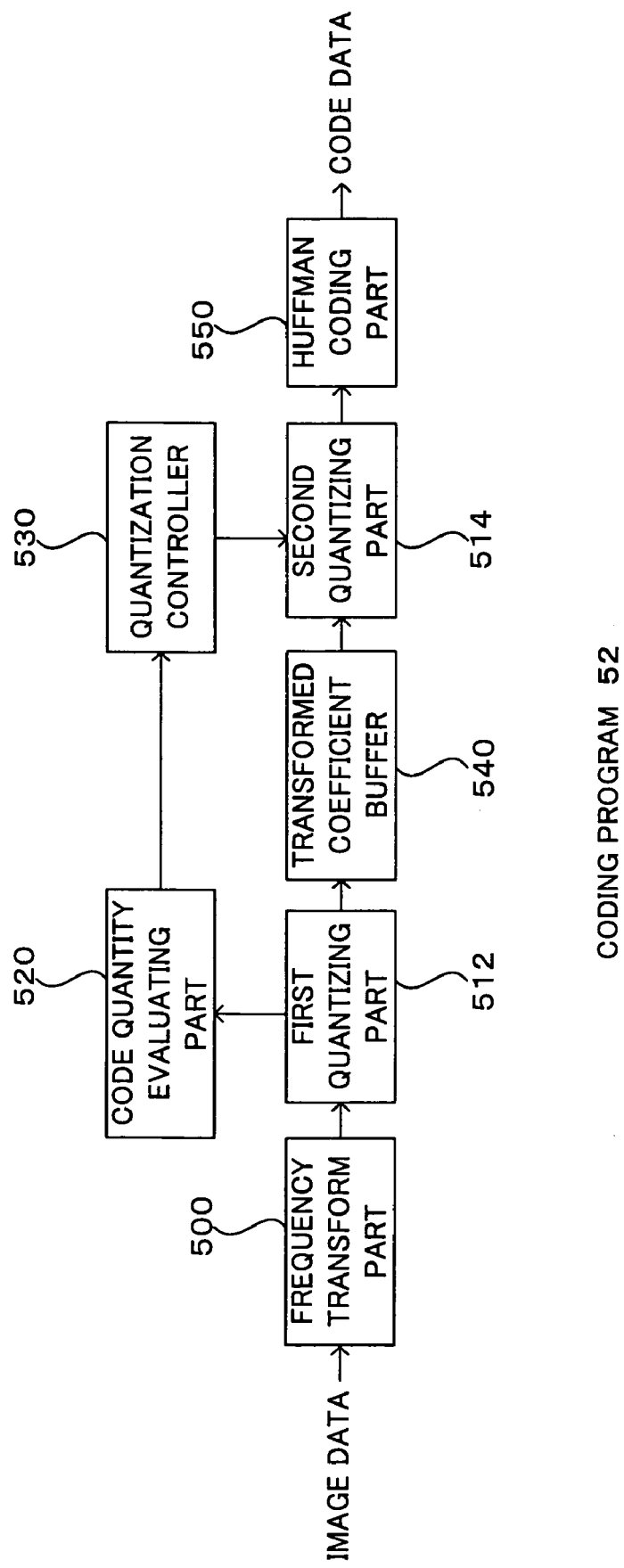
FIG. 8 is a diagram showing a functional configuration of a coding program 52 provided with two quantizing units.

The first quantizing unit 512 illustrated in FIG. 8 performs a quantization (i.e., looser quantization) with a fixed scaling factor (relatively small SF), while the second quantizing unit 514 performs a quantization with a scaling factor by which a desired code quantity can be obtained. The quantization by the second quantizing unit 514 is stronger (quantization having great lossiness) than that by the first quantizing unit 512.

In this modified example, the transformed coefficient quantized by the first quantizing unit 512 is superimposingly quantized by the second quantizing unit 514.

The coding program 52 has the first quantizing unit 512 and the second quantizing unit 514 described above, whereby the code quantity control can be carried out with one pass.

Although the above-mentioned exemplary embodiment and modified example perform the adjustment of the quantization process by the scaling factor only, the first quantizing unit 512 may perform a quantization by using a quantization table in which all of the quantization coefficients are 1, when it is intended to add non-linear change to the quantization table. In this quantization by the quantization table, the coefficients are made into an integer, and the quantization more than that is not performed.

The second quantizing unit 514 sets the quantization coefficient for every position in the block of 8×8. Accordingly, it is possible to estimate the number of the non-zero coefficient to the optional quantization coefficient. It is to be noted that all the quantization coefficients of the first quantizing unit 512 may be set to 0.5. In this case, the distribution of the transformed coefficient can be estimated without an error.

When the quantization controller 530 determines the quantization table such that the number of the non-zero coefficient is within the desired value, it may select one quantization table among the fixed quantization table group, or may finely adjust the scaling factor multiplied to the quantization table.

Further, the quantization controller 530 may have an algorithm for non-linearly calculating the quantization table according to the degree of the quantization. For example, since an error is perceivable at the lower frequency region when the quantization becomes strong, the quantization controller 530 preferably creates a quantization table with an algorithm so as to increase the quantization coefficient at the higher frequency region when the overall quantization coefficient increases.

MODIFIED EXAMPLE 3

Although the exemplary embodiment described above describes the case of converting image data into code data, the invention is not limited thereto. For example, the inputted code data may be re-coded.

Figure 9:
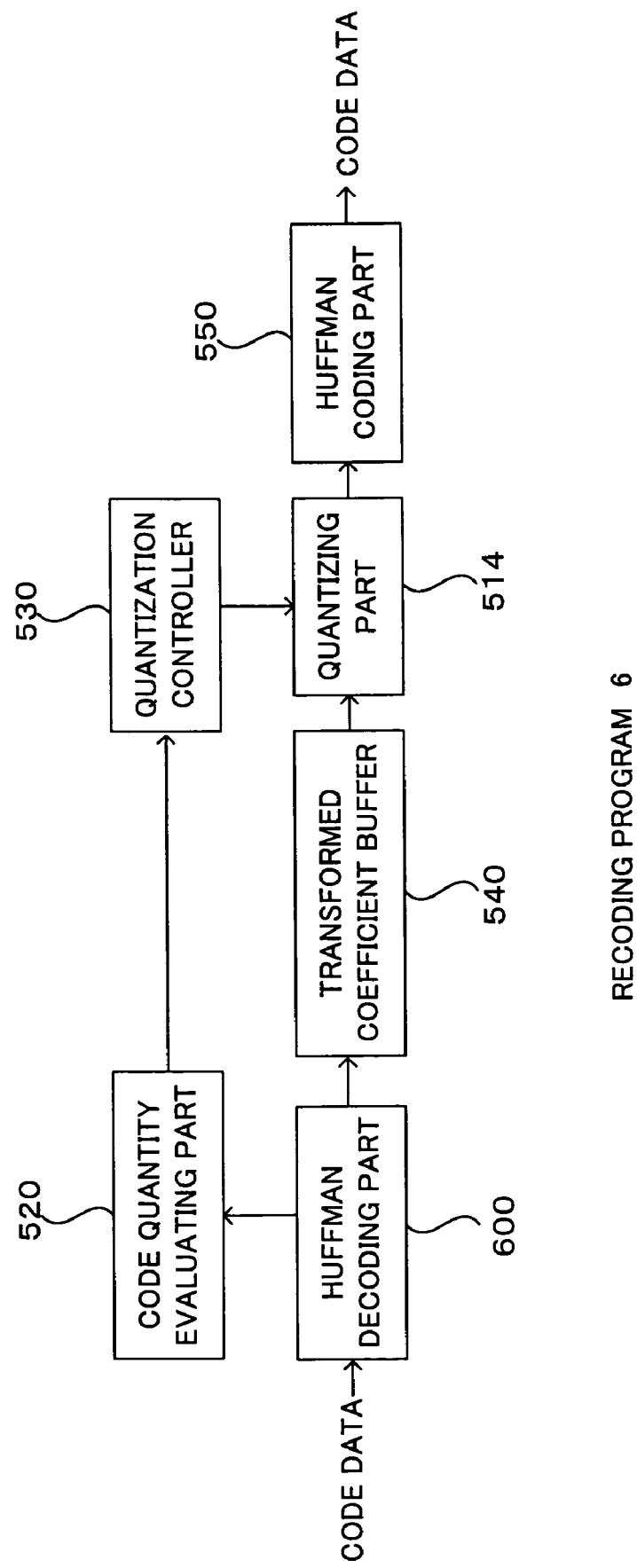
FIG. 9 is a diagram illustrating a functional configuration of a recoding program 6.

FIG. 9 is a diagram illustrating a functional configuration of a recoding program 6. The components in this figure substantially same as those shown in FIG. 8 are identified with the same numerals.

As illustrated in FIG. 9, the recoding program 6 has a Huffman decoding part 600, the code quantity evaluating part 520, quantization controller 530, transformed coefficient buffer 540, quantizing unit 514, and Huffman coding part 550.

In the recoding program 6, the Huffman decoding part 600 decodes the inputted code data to generate a transformed coefficient, and outputs the generated transformed coefficient to the code quantity evaluating part 520 and the transformed coefficient buffer 540.

The code quantity evaluating part 520 creates a histogram of the transformed coefficient on the basis of the transformed coefficient inputted from the Huffman decoding part 600, and outputs the created histogram to the quantization controller 530.

The quantization controller 530 determines a quantization coefficient that achieves the desired code quantity on the basis of the histogram of the transformed coefficient created by the code quantity evaluating part 520, and sets the determined quantization coefficient to the quantizing unit 514.

The quantizing unit 514 quantizes the transformed coefficient inputted from the transformed coefficient buffer 540 by using the quantization coefficient set by the quantization controller 530, and outputs the quantized coefficient to the Huffman coding part 550.

The Huffman coding part 550 encodes the transformed coefficient quantized by the quantizing unit 514 with Huffman code.

Thus, the recoding program 6 in this modified example can control the code quantity on the basis of the statistical information of intermediate data (transformed coefficient in this modified example) during the recoding process. For example, this modified example serves recoding with a printer driver better.

Second Embodiment

Subsequently, a second exemplary embodiment will be explained. The exemplary embodiment described above describes the case where an aspect of the present invention is applied to a transform coding scheme. In this exemplary embodiment, the case where an aspect of the present invention is applied to a predictive coding scheme is explained.

In this exemplary embodiment, the trial of the entropy coder can be avoided by using the statistics of the symbol (intermediate data) which will be object of coding, but in order to avoid the trial in the source coder, it is necessary to estimate the quantization parameter for obtaining the desired code quantity.

For this, it is necessary to not only count the intermediate data (e.g., hitting ratio of prediction, number of prediction errors) outputted from the source coder but also analytically estimate the strength of the necessary quantization from its distribution.

In a simple run-length coding or a coding using a run length such as LZ coding, among predictive coding schemes, how much of run is not got, i.e., which degree the prediction is inaccurate affects the code quantity. Here, the pixel which is included in run due to right prediction is referred to as run pixel, and the pixel which is not included in any run is referred to as non-run pixel.

As shown in FIG. 1(B), the code quantity in the predictive coding scheme depends upon the appearance frequency of the non-run pixels. The degree of the dependency differs depending upon the applying manner of the quantization.

This exemplary embodiment describes, as a specific example, a quantization in which, even if the prediction error occurs due to the wrong prediction, the error is assumed to be zero if the error is not more than the threshold value. The quantization of this type is employed by the international standardization JPEG-LS.

In the quantization described above, the prediction error not more than the threshold value is all quantized to zero to become a run pixel. Therefore, if the distribution of the prediction error before the quantization is found, the change in the number of the run pixels and non-run pixels can be estimated.

Notably, it is the number of the non-run pixels that can be estimated here, and attention should be given to the fact that the number of the non-run pixels is not counted. Specifically, the statistics gathered here is based upon the distribution upon no quantization (or when another quantization is carried out). When the actual quantization is carried out, the quantized pixel value appears, so that the frequency distribution of the appearance of the prediction error is also affected by quantized pixel value. Therefore, the estimated value includes some degree of error with respect to the measured value.

This exemplary embodiment will more specifically be explained below.

Figure 10:
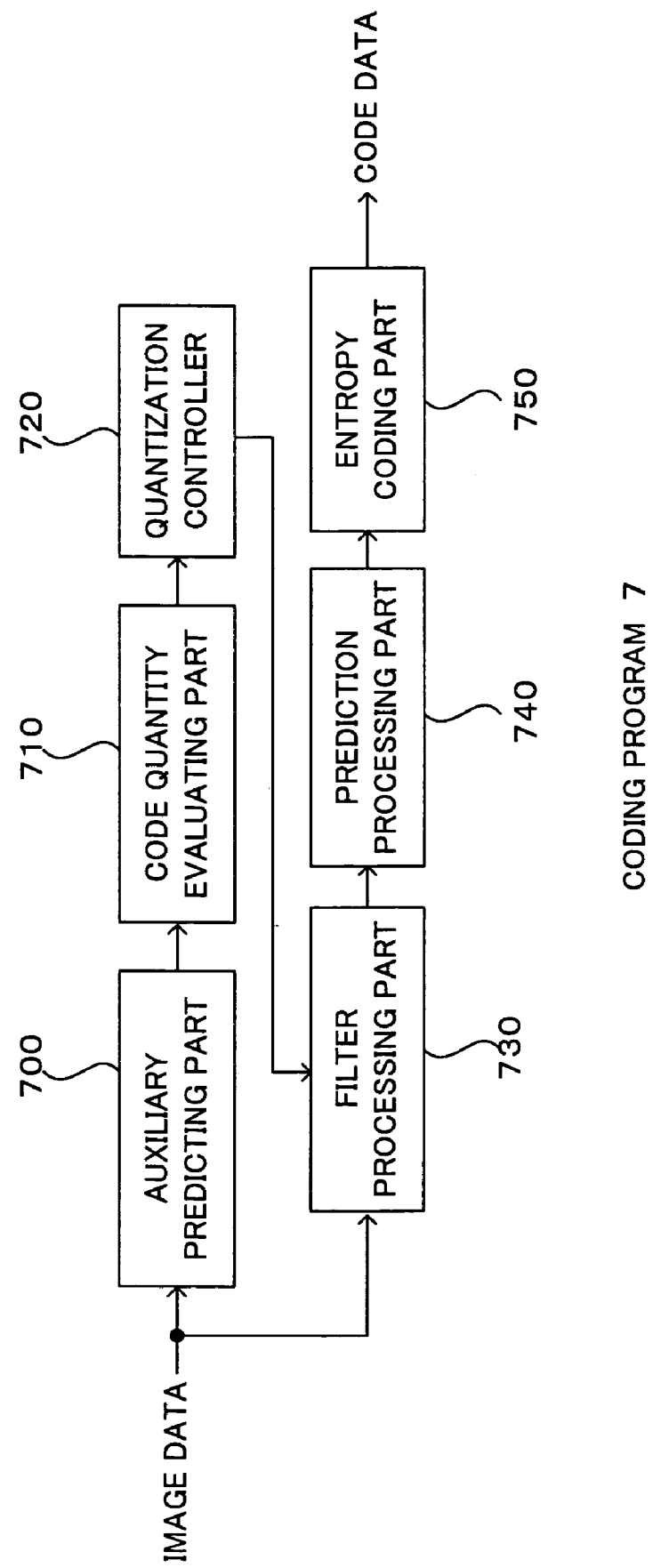
FIG. 10 is a diagram illustrating a functional configuration of a coding program 7 to which a predictive coding scheme is applied.

FIG. 10 is a diagram illustrating a functional configuration of the coding program 7 in the second exemplary embodiment.

As illustrated in FIG. 10, the coding program 7 has an auxiliary predicting part 700, a code quantity evaluating part 710, a quantization controller 720, a filter processing part 730, a prediction processing part 740, and an entropy coding part 750.

In the coding program 7, the auxiliary predicting part 700 generates at least some of intermediate data (in this example, information indicating that the prediction proves right, and a prediction error generated when the prediction proves wrong).

The auxiliary predicting part 700 in this example generates a predicting part ID indicating the predicting method by which the prediction proves right and its continuous number, and a prediction error when the prediction by any one of the prediction methods proves wrong, but the invention is not limited thereto. For example, it may generate only the prediction error.

The code quantity evaluating part 710 evaluates the code quantity on the basis of the intermediate data generated by the auxiliary predicting part 700.

The code quantity evaluating part 710 in this example creates a frequency distribution (histogram) of the generated prediction error, and estimates the code quantity on the basis of the created frequency distribution.

The quantization controller 720 controls the quantization process by the filter processing part 730 based upon the result of the evaluation of the code quantity by the code quantity evaluating part 710.

When the code quantity evaluated by the code quantity evaluating part 710 is not more than the desired code quantity, the quantization controller 720 in this example instructs the filter processing part 730 to encode the inputted image data without performing the quantization, and when the estimated code quantity exceeds the desired code quantity, it instructs the filter processing part 730 to perform the quantization process to the inputted image data.

Further, the quantization controller 720 estimates the quantization parameter by which the desired code quantity can be achieved on the basis of the histogram created by the code quantity evaluating part 710, and sets the estimated quantization parameter to the filter processing part 730.

The filter processing part 730 performs to the image data a quantization process by which the hitting ratio of the prediction by the prediction processing part 740 is enhanced, in accordance with the quantization parameter set by the quantization controller 720.

The filter processing part 730 in this example fills each region of the inputted image in which the tonal range is within the quantization parameter (allowable error) set by the quantization controller 720 with one pixel value to enhance the hitting ratio of the prediction by the prediction processing part 740.

The prediction processing part 730 generates prediction data for the image data inputted from the filter processing part 730 with the existing prediction method, and compares the generated prediction data with the inputted image data to generate agreement data (intermediate data) of the prediction data and the image data.

When the prediction value, which is the pixel value of the pixel (reference pixel) in the neighborhood of the target pixel, agrees with the pixel value of the target pixel, the prediction processing part 730 in this example outputs the information (predicting part ID) indicating that the pixel values agrees with each other and its continuous number (length of run), and when the prediction value does not agree with the pixel value of the target pixel, it outputs the difference between the prediction value and the pixel value of the target pixel as a prediction error.

The entropy coding part 750 entropy-codes the agreement information (intermediate data) inputted from the prediction processing part 730.

The entropy coding part 750 in this example entropy-codes the prediction unit ID and the length of run, and the prediction error inputted from the prediction processing part 730.

Figure 11:
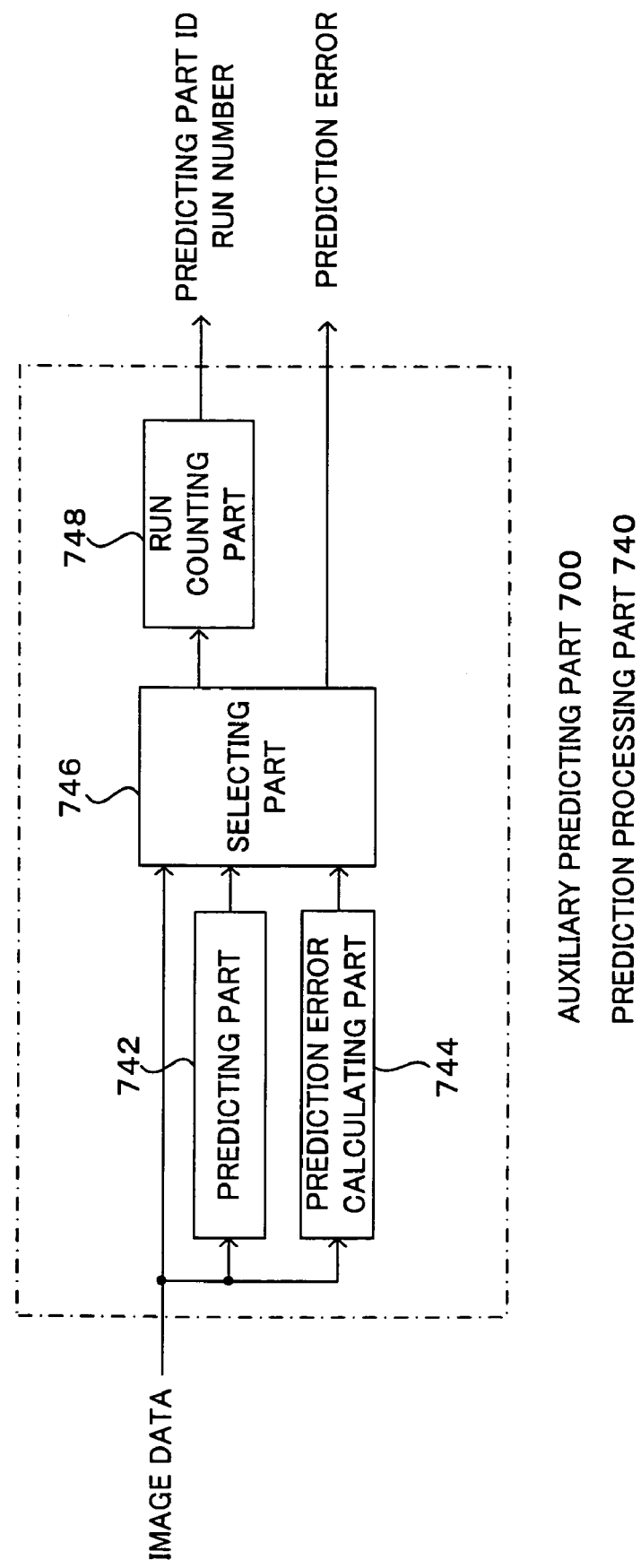
FIG. 11 is a diagram explaining in detail an auxiliary predicting part 700 and prediction processing part 740.

FIG. 11 is a diagram for explaining in detail the configurations of the auxiliary predicting part 700 and the prediction processing part 740. In this example, the auxiliary predicting part 700 and the prediction processing part 740 have the same configuration, but the invention is not limited thereto. For example, a run counting part 748 is unnecessary for the auxiliary predicting part 700.

The configuration of the prediction processing part 740 will be explained below.

As shown in FIG. 11, the prediction processing part 740 has a predicting part 742, prediction error calculating part 744, selecting part 746, and run counting part 748.

The predicting part 742 outputs the pixel values at the fixed reference positions A to D illustrated in FIG. 12(A) to the selecting part 746 as the prediction values.

The prediction error calculating part 744 outputs the difference between the pixel value at the reference position A and the pixel value of the target pixel X shown in FIG. 12(A) to the selecting part 746 as the prediction error value.

The selecting part 746 compares each of the prediction values inputted from the predicting part 742 with the pixel value of the target pixel X to determine whether they agree with each other. If there is the prediction value (reference position) in which the prediction proves right as a result of the determination, the selecting part 746 outputs its identification number (i.e., predicting part ID) to the run counting unit 748 (in the case of the auxiliary predicting part 700, to the code quantity evaluating part 710), while if all the predictions prove wrong, it outputs the prediction error value inputted from the prediction error calculating part 744 to the run counting unit 748 (in the case of the auxiliary predicting part 700, to the code quantity evaluating part 710) and the entropy coding unit 750 in FIG. 10.

When the identification number (predicting part ID) is inputted, the run counting part 748 increments the internal counter corresponding to the predicting part ID by 1. When the prediction error is inputted (i.e., when all the predictions prove wrong), the run counting part 748 outputs to the entropy coding part 750 (FIG. 10) the value of the internal counter corresponding to each of the predicting part IDs and the reference positions ID as run data.

FIGS. 12(A) to 12(C) are diagrams for explaining the coding process by the prediction processing part 740 and the entropy coding part 750.

As illustrated in FIG. 12(A), when the pixel value of the target pixel X is encoded, the other pixel (in this example, pixels at the reference positions A to D) is referred to for generating the prediction value of the target pixel X, and the agreement information of the generated prediction value and the pixel value of the target pixel X is encoded in the predictive coding process in this example. Here, the agreement information means the information indicating the degree of agreement between the prediction value and the actual value. Examples of the agreement information include whether the prediction value and the actual value agree with each other, whether the difference is within the fixed range, the difference (prediction error value) between the prediction value and the actual value, or the like. The reference positions A to D in this example are set as the relative position of the target pixel X. Specifically, the reference position A is set at the upstream side of the target pixel X in the fast-scanning direction, and the reference positions B to D are set on the fast-scanning line at the upper side of the target pixel X (at the upstream side in the slow-scanning direction).

When the pixel value (prediction value) read from any one of the reference positions agrees with the pixel value of the target pixel X (i.e., when the prediction proves right at any one of the reference positions), the information specifying the agreed reference position (hereinafter referred to as predicting part ID) is outputted as the symbol (intermediate data) of the target pixel X. Further, when the prediction value read from the same reference position continuously agrees with the pixel values of plural target pixels X, the predicting part ID of this reference position and the continuous number (length of run) are outputted as the symbol of these target pixels X. Accordingly, the greater the number of the continuous agreement (continuous agreement length) is, the more the coding efficiency enhances. In the predictive coding process in this example, the predicting part ID is associated with the code as illustrated in FIG. 12(B).

When the pixel values (prediction values) at any one of the reference positions do not agree with the pixel value of the target pixel X, the difference (prediction error value) between the pixel value at the reference position A and the pixel value of the target pixel X is outputted as the symbol of the target pixel X to be encoded in the predictive coding system in this example.

The code data generated by this is composed of the code indicating the prediction error, the code corresponding to the reference position where the prediction value proves right, and its continuous number, as illustrated in FIG. 12(C).

Figure 13:
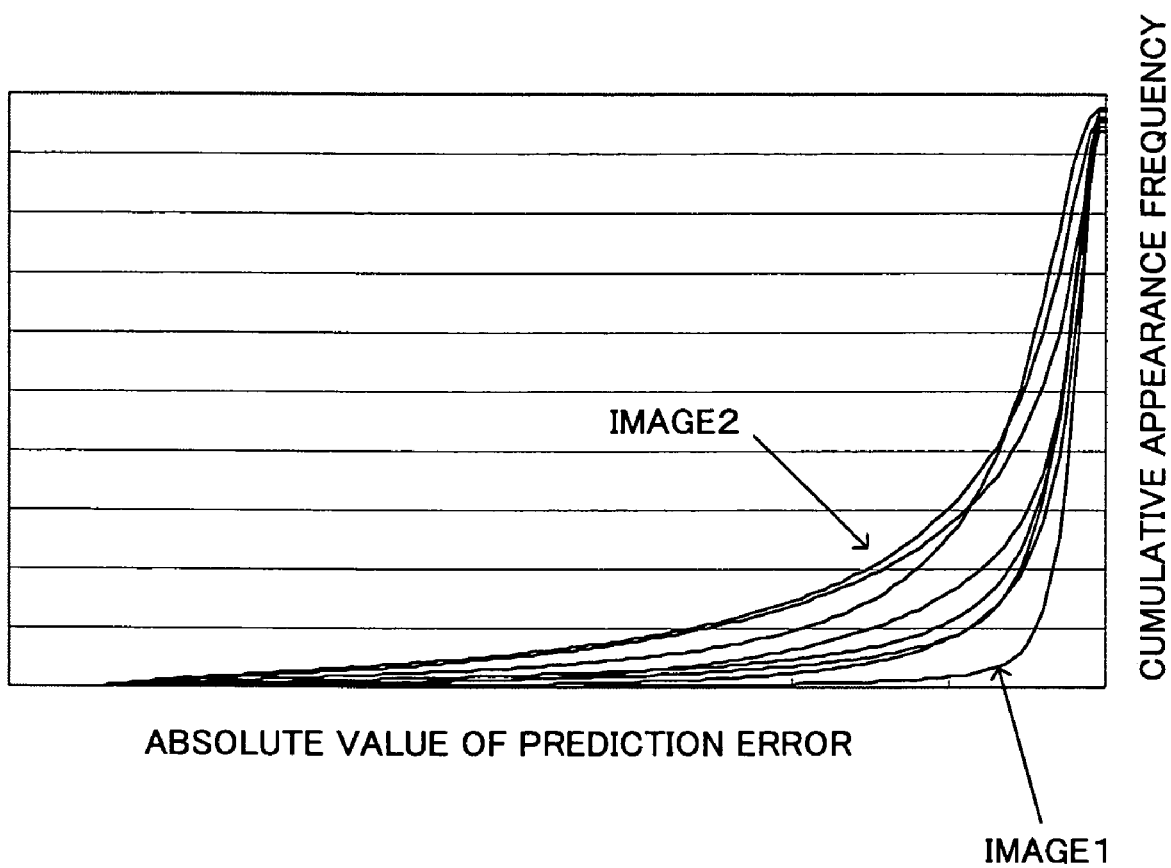
FIG. 13 is a graph showing a cumulative appearance frequency of prediction errors.

FIG. 13 is a diagram illustrating the distribution of cumulative frequency of the prediction error created by the code quantity evaluating part 710.

As shown in FIG. 13, the distribution of the prediction error increases depending upon an image. Comparing with the graph illustrated in FIG. 1(B) (the graph showing the appearance frequency of non-run pixels and code quantity), it is found that the image 1 in which the prediction errors are generally small has a high decreasing effect of the number of non-run pixels and code quantity at the same quantization parameter (allowable error), and the image 2 in which the prediction errors are not generally small shows the reverse effect.

On the basis of this principle, the code quantity evaluating part 710 and the quantization controller 720 in this example evaluate the code quantity when predetermined quantization is carried out.

Figure 14:
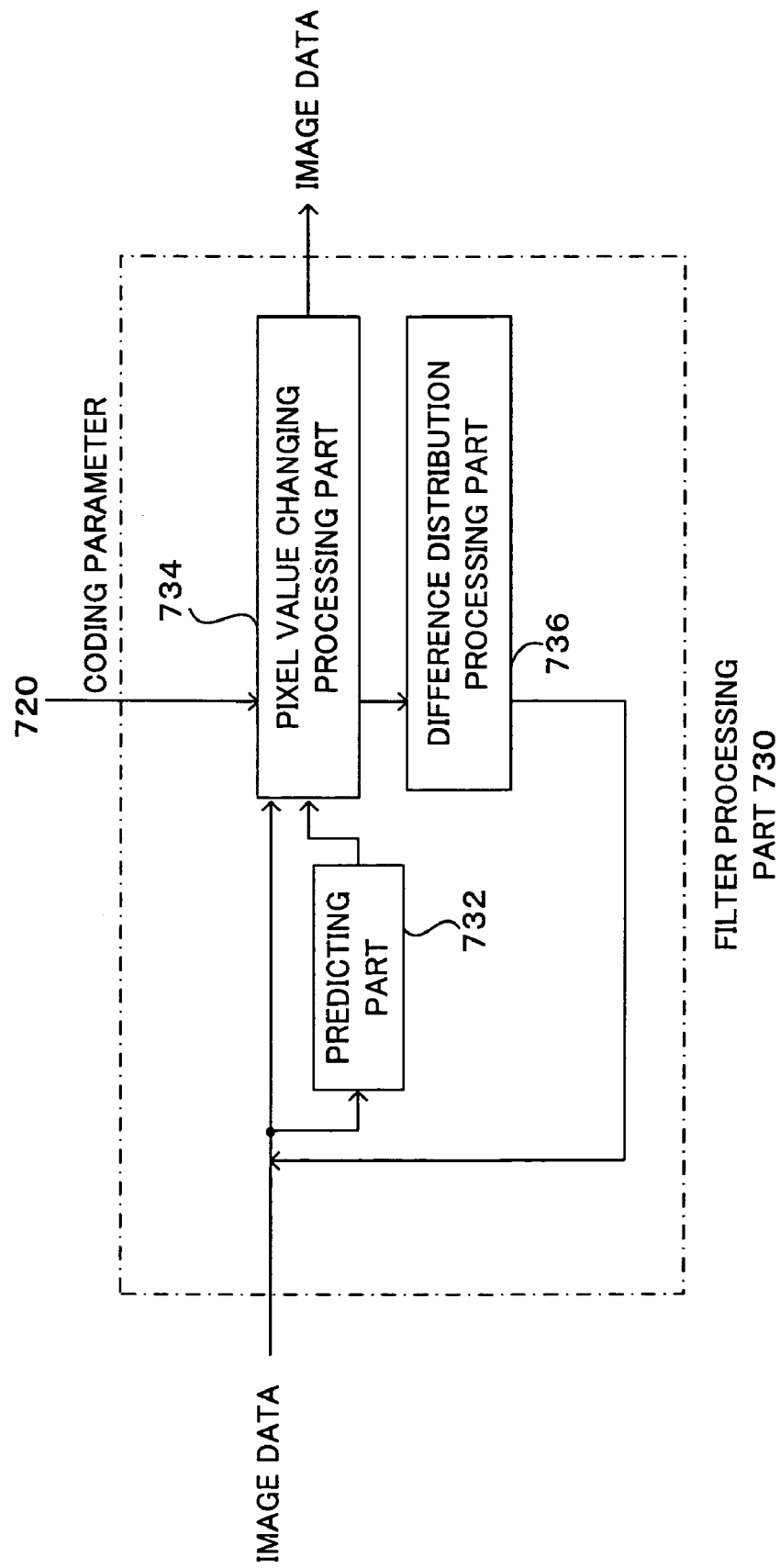
FIG. 14 is a diagram for explaining in detail a filter processing part 730.

FIG. 14 is a diagram for explaining in detail the configuration of the filter processing part 730.

As shown in FIG. 14, the filter processing part 730 has a predicting part 732, a pixel value changing processing part 734, and an error distribution processing part 736.

Figure 12:
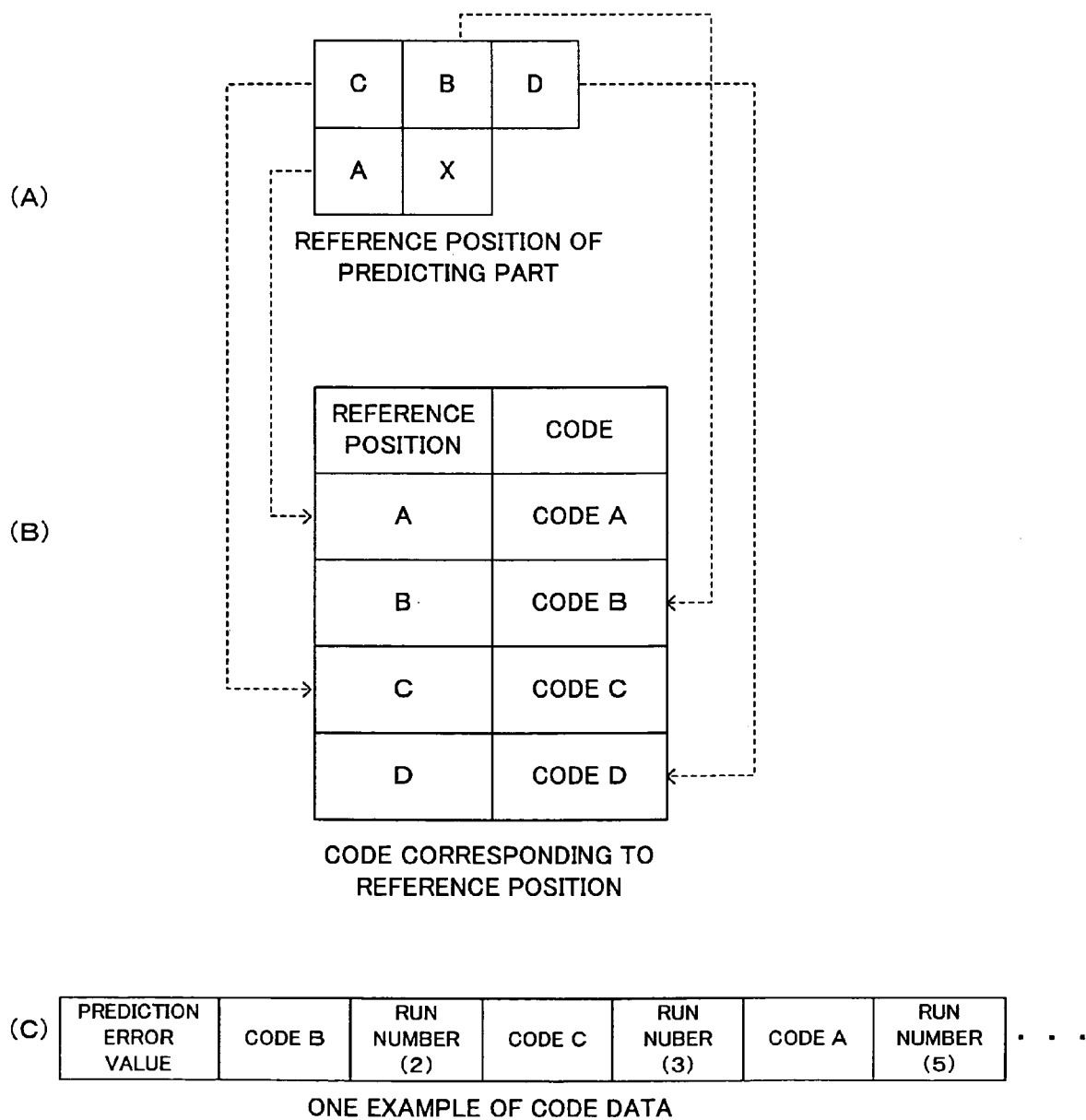
FIGS. 12(A) to 12(C) are diagrams for explaining the predictive coding scheme in this exemplary embodiment.

The predicting part 736 outputs to the pixel value changing processing part 734 the pixel values at plural reference positions A to D illustrated in FIG. 12 (A) as the prediction value of the target pixel X. It is to be noted that, in this exemplary embodiment, each of the pixel values at the reference positions A to D is defined as the prediction value, but the invention is not limited thereto. It may suffice that a pixel value of at least one reference position is defined as the prediction value.

The pixel value changing processing part 734 compares the pixel value of the target pixel X with the prediction value inputted from the predicting part 732. When the difference between the pixel value and the prediction value is smaller than an allowable error specified by the coding parameter, the pixel value changing processing part 734 outputs the prediction value to the subsequent part (prediction processing part 740), and outputs the difference between the pixel value of the target pixel and the prediction value (hereinafter referred to as error) to the error distribution processing part 736. When the difference is within the allowable error for plural prediction values, the prediction value whose difference is the smallest is applied.

Further, the pixel value changing processing part 734 gradually decreases the allowable error when the difference between the pixel value and the prediction value is smaller than the coding parameter (allowable error).

On the other hand, when the difference between the pixel value of the target pixel X and the prediction value is not less than the allowable error, the pixel value changing processing part 736 outputs the pixel value of the target pixel X as unchanged to the subsequent part (prediction processing part 740), and outputs zero to the error distribution processing part 736. In other words, when the prediction error is not less than the allowable error, the filter processing part 730 does not distribute the error not less than the allowable error without performing the conversion of the pixel value of the target pixel X. Therefore, as the allowable error (coding parameter) is great, the pixel value of the inputted image is changed, whereby the hitting ratio of the prediction by the subsequent prediction processing part 740 is enhanced, and the compression rate is increased.

The error distribution processing part 736 generates an error distribution value based upon the error inputted from the pixel value changing processing part 734, and adds the generated value to the pixel value of the predetermined pixel included in the image data. The error distribution value is, for example, calculated by multiplying the error by weight matrix in accordance with an error diffusion method or minimized average error method.

As described above, the filter processing part 730 converts the pixel value included in the image data such that the prediction by the subsequent prediction processing part 740 is easy to be right. In this case, the filter processing part 730 distributes the difference from the actual pixel value generated by the change of the pixel value to the peripheral pixels in order to make the change of the pixel value macroscopically unnoticeable.

[Overall Operation]

Subsequently, the overall operation of the data processing apparatus 2 (coding program 7) according to the second exemplary embodiment will be explained.

Figure 15:
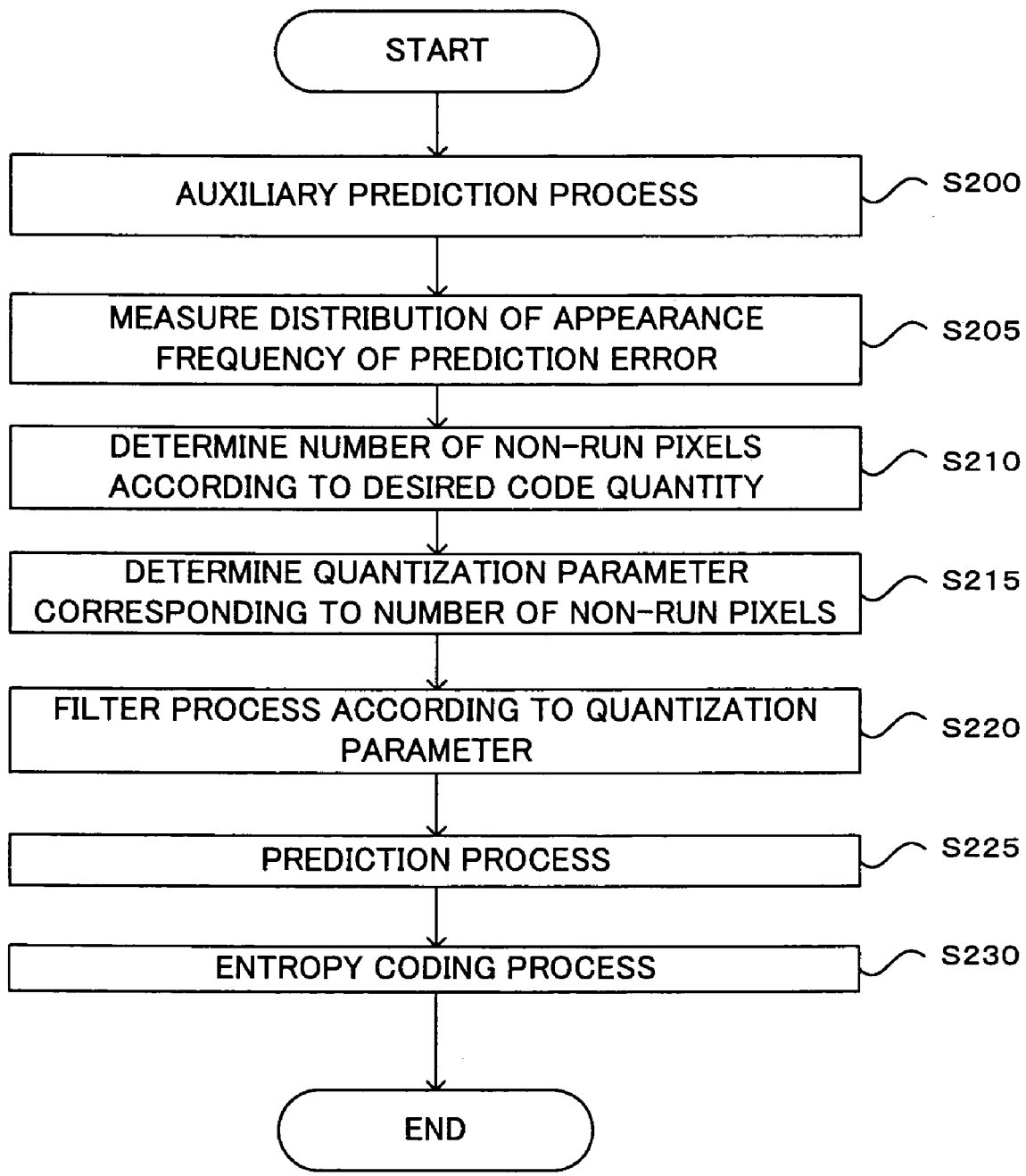
FIG. 15 is a flowchart of a coding process (S20) in the coding program 7 (FIG. 10)

FIG. 15 is a flowchart of a coding process (S20) by the coding program 7 (FIG. 10).

As shown in FIG. 15, when image data is externally inputted, the auxiliary predicting part 700 (FIG. 10) calculates the prediction error (difference between the pixel value of the target pixel X and the pixel value at the reference position A) for the inputted image data, and outputs the calculated difference value (prediction error) to the code quantity evaluating part 710 at step 200 (S200).

At step 205 (S205), the code quantity evaluating part 710 creates the distribution (histogram) of the appearance frequency of the prediction error inputted from the auxiliary predicting part 700, and outputs the created distribution of the appearance frequency to the quantization controller 720.

At step 210 (S210), the quantization controller 720 calculates the number of non-run pixels corresponding to the desired code quantity by using the approximate equation of the graph illustrated in FIG. 1(B).

At step 215 (S215), the quantization controller 720 determines the allowable error (quantization parameter) by which the calculated number of non-run pixels is achieved, on the basis of the distribution of the appearance frequency inputted from the code quantity evaluating part 710, and outputs the determined quantization parameter to the filter processing part 730.

At step 220 (S220), the filter processing part 730 performs a filter process to the inputted image data by using the allowable error (quantization parameter) inputted from the quantization controller 720, and outputs to the prediction processing part 740 the image data to which the filter process is performed.

At step 225 (S225), the prediction processing part 740 performs a prediction process to the image data inputted from the filter processing part 730, creates the predicting part ID and its run length, and a prediction error, and outputs the created predicting ID, run length and a prediction error to the entropy coding part 750 as the symbol.

At step 230 (S230), the entropy coding part 750 encodes the symbol (predicting part ID, run length, and prediction error) inputted from the prediction processing part 740 with Huffman code.

As explained above, the data processing apparatus 2 according to this exemplary embodiment can evaluate the code quantity based upon the distribution of the prediction error.

Accordingly, the control of the desired code quantity is possible even in the predictive coding scheme without repeating the entropy coding process.

MODIFIED EXAMPLE 1

Subsequently, a modified example of the second exemplary embodiment will be explained.

The distribution in FIG. 1(B) hardly changes depending upon an image. Therefore, although the correction for every image is not so important, different from the distribution of the prediction errors, providing this correction can enhance control precision.

The subject that should be corrected is the deviation of each plot in the vertical direction in FIG. 1(B). In order to correct the deviation, it is necessary to find the code quantity at any one of points. The code quantity may actually be any one at any points. In this modified example, the case where the code quantity of no quantization is used will be explained.

FIG. 16(A) illustrates the functional configuration of the coding program 72 in the first modified example, while FIG. 16(B) illustrates the result of the experiment. Each component in this figure substantially the same as that in FIG. 10 is identified with the same numeral.

As illustrated in FIG. 16(A), the coding program 72 in this modified example further has an auxiliary coding unit 760. The auxiliary coding unit 760 entropy-codes the symbol (predicting part ID, run length, and prediction error) generated by the auxiliary predicting part 700.

The quantization controller 722 in this example corrects the approximate equation of the graph shown in FIG. 1(B) on the basis of the code quantity (code quantity of no quantization) generated by the auxiliary coding unit 760. More specifically, the quantization controller 722 adjusts the y-intercept so as to pass the plot of the code quantity (code quantity of no quantization) generated by the auxiliary coding unit 760.

As shown in FIG. 16(B), comparing the case where the correction by the auxiliary coding is performed with the case where the correction by the auxiliary coding is not performed, the deviation in the y-direction between images can be absorbed more in the case where the correction by the auxiliary coding is performed, whereby the linearity is more enhanced, and the estimating precision is enhanced.

It should be noted that the graph in this FIG. represents the relationship between the number of non-run pixels and code quantity with the logarithm of these on both axes.

MODIFIED EXAMPLE 2

In the above-mentioned exemplary embodiment, the auxiliary predicting part 700 calculates the prediction error in the no-quantization state, and the code quantity is evaluated by using this prediction error, but the invention is not limited thereto. For example, when the compression rate (e.g., 10 or more of the compression rate in a photographic image) that is not likely to be capable of being realized without the quantization is aimed, the auxiliary predicting part 700 is caused to calculate the prediction error for the image data after being subject to the suitable quantization, and the code quantity may be evaluated by this prediction error.

In this case, it is desirable that the quantization before the auxiliary prediction is relatively weak.

MODIFIED EXAMPLE 3

In the second exemplary embodiment, the quantization parameter for obtaining the desired code quantity is estimated on the basis of the distribution of the appearance frequency of the prediction error in order to stop the trial at the source coder.

However, the filter processing part 730 in this exemplary embodiment performs quantization (quantization accompanied by error diffusion) that feeds back the quantization error. Further, when the quantization is consecutively performed, the threshold value (allowable error) is reduced in accordance with the consecutive length in order to avoid the excessive filling with the same pixel value. Therefore, the quantization by the filter processing part 730 has an extremely non-linear effect, whereby it is difficult to estimate the number of non-run pixels with high precision from the distribution of the prediction error and the allowable error (threshold value).

Figure 17:
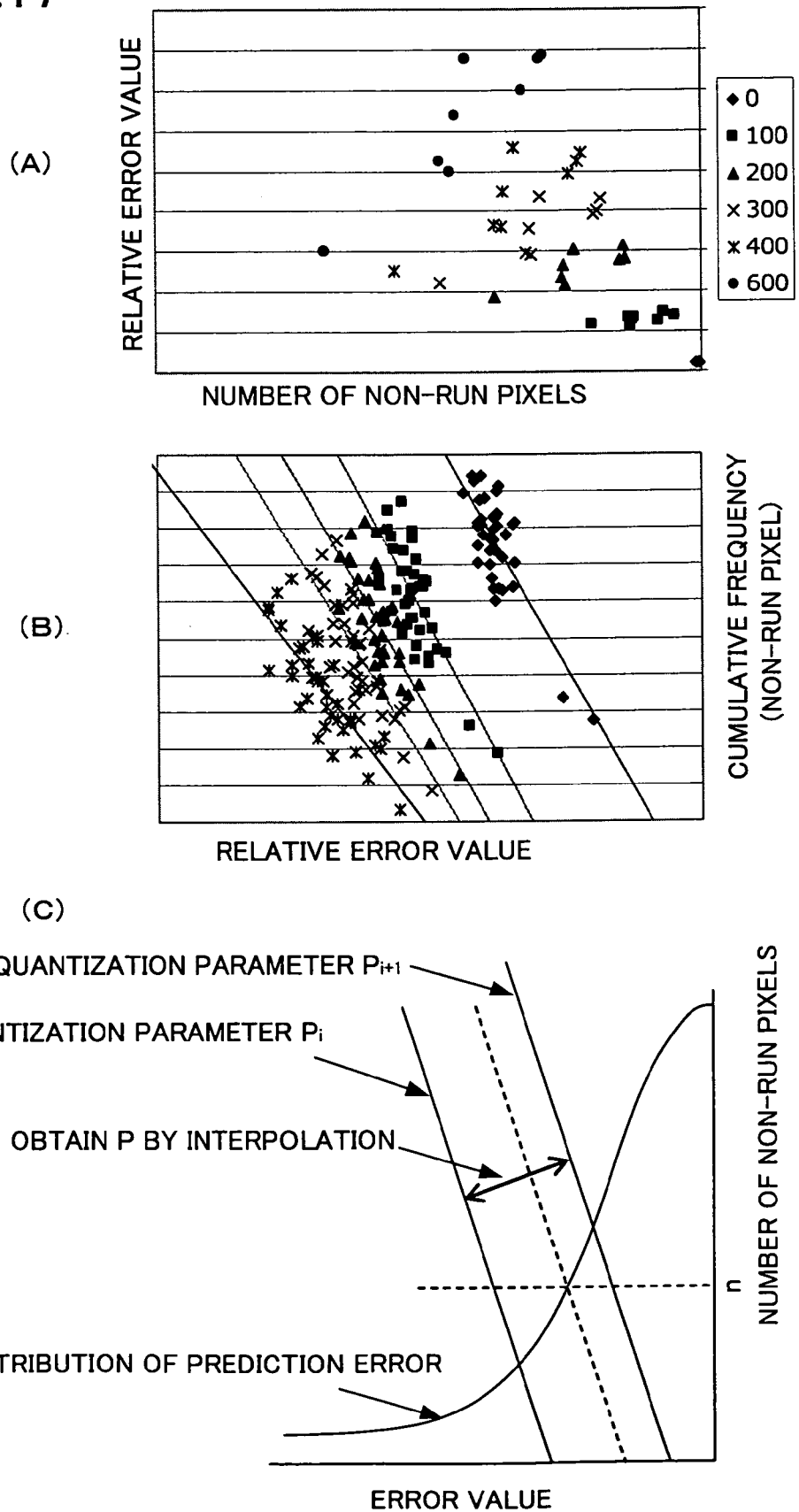
FIGS. 17(A) to 17(C) are diagrams for explaining a method of calculating a quantization parameter when a non-linear quantization is performed by the filter processing part 730.

FIG. 17(A) is a graph showing the relationship between the quantization parameter (allowable error) and the number of non-run pixels when the non-linear quantization by the filter processing part 730 is performed. In this graph, the number of non-run pixels is plotted at axis of abscissa (X-axis) and relative error value is plotted at axis of ordinate (Y-axis). Here, the relative error value indicates the prediction error value (absolute value) corresponding to a certain number of non-run pixels for a specific image.

If the allowable error (quantization parameter) simply acts as the threshold value for the X-axis in FIG. 13, the relative error value in the same quantization parameter must be constant not dependent upon an image. However, in FIG. 17(A), the relative error value is not constant. Specifically, the level of the substantial allowable error differs depending upon an image even in the same allowable error (quantization parameter). Accordingly, even if an image and quantization parameter are given, the allowable error or the number of non-run pixels cannot highly precisely be estimated, and hence, the code quantity cannot be estimated, either.

However, carefully observing FIG. 17(A), the plots at the same quantization parameter look like being on the lines each having a different slope. In view of this, when the plots in FIG. 17(A) are increased, X and Y axes are exchanged, and the plots are made on the double logarithmic graph, it is found that they are relatively well approximated on a straight line.

The fact that the quantization parameters are thus generally approximated on a straight line means that the relationship between the prediction error value and the number of non-run pixels is determined depending only upon the quantization parameter, not an image.

In other words, the number of non-run pixels obtained by a certain quantization parameter differs depending upon an image, but a fixed relationship is established between the number of non-run pixels and the relative error value.

On the other hand, since the error and the cumulative value of the number of non-run pixels can be statistically obtained as seen from FIG. 13, the intersection at FIG. 13 and FIG. 17(B) for a specific set of an image and quantization parameter is obtained, wherein the obtained intersection corresponds to the number of non-run pixels to be obtained. Then, the estimated code quantity can be obtained from this number of non-run pixels and the graph in FIG. 1(B).

In the actual process, the data or approximate equation in FIG. 1(B) and FIG. 17(B) is designed beforehand and used. A linear approximation or non-linear approximation may be employed for the approximate equation.

Specifically, the data processing apparatus 2 in the third modified example does not obtain the number of non-run pixels directly from the graph in FIG. 13 and the allowable error (quantization parameter) but controls the code quantity by utilizing the fixed relationship (image non-dependency) between the relative error value and the number of non-run pixels for the same quantization parameter.

More specifically, as illustrated in FIG. 17(C), the data processing apparatus 2 in this modified example calculates the intersection of the distribution of the cumulative appearance frequency of the prediction error and the approximate equation of the graph shown in FIG. 17(B), and calculates by the interpolation the quantization parameter p corresponding to the desired number of non-run pixels n (i.e., code quantity) among the calculated intersections.

Figure 18:
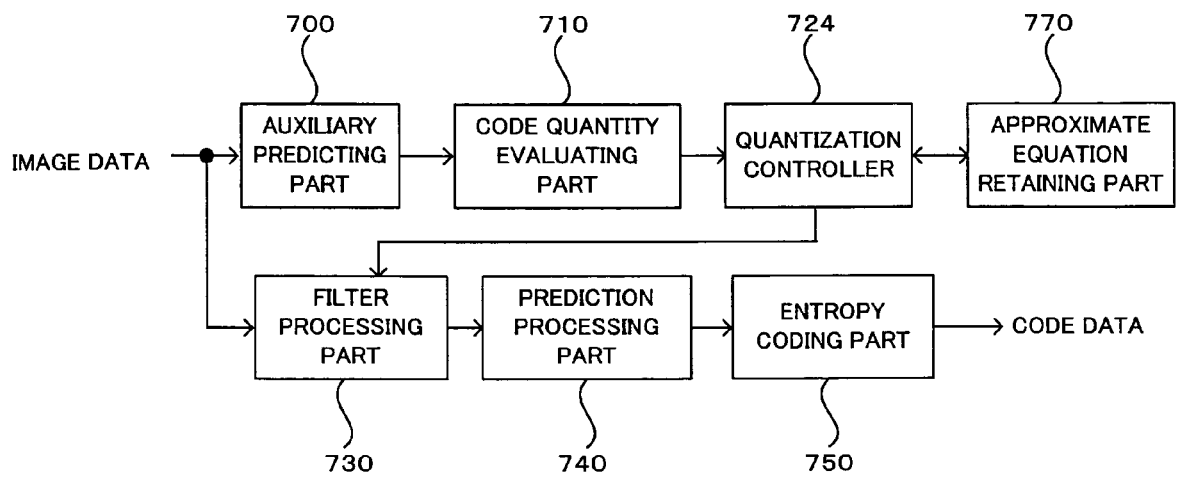
FIG. 18(A) illustrates a functional configuration of a coding program 74.
FIG. 18(B) is a diagram illustrating an approximate equation retained by an approximate equation retaining part 770.

FIG. 18 (A) illustrates a functional configuration of the coding program 74 in this modified example, while FIG. 18(B) is a diagram illustrating the approximate equation retained by an approximate equation retaining part 770. Each component in this figure substantially same as that in FIG. 10 is identified with the same numeral.

As illustrated in FIG. 18(A), the approximate equation retaining part 770 stores the approximate equation, which approximates the graph illustrated in FIG. 17(B), so as to associate with the corresponding quantization parameter (allowable error) in the coding program 74. The approximate equation retaining part 770 in this example retains plural approximate equations associated with each of plural quantization parameters (allowable errors) as illustrated in FIG. 18(B).

The quantization controller 724 in this modified example calculates the intersection of the distribution (FIG. 13) of the cumulative appearance frequency of the prediction errors created by the code quantity evaluating part 710 and the plural approximate equations (graph in FIG. 17(B)) retained by the approximate equation retaining part 770, and calculates the quantization parameter (allowable error) corresponding to the desired number of non-run pixels with the interpolation by using the calculated value of the intersection.

It is to be noted that, if the interval of the quantization parameter is small, the linear interpolation may be performed, or multiple interpolation using the intersection of the next and previous quantization parameters may be performed.

Figure 19:
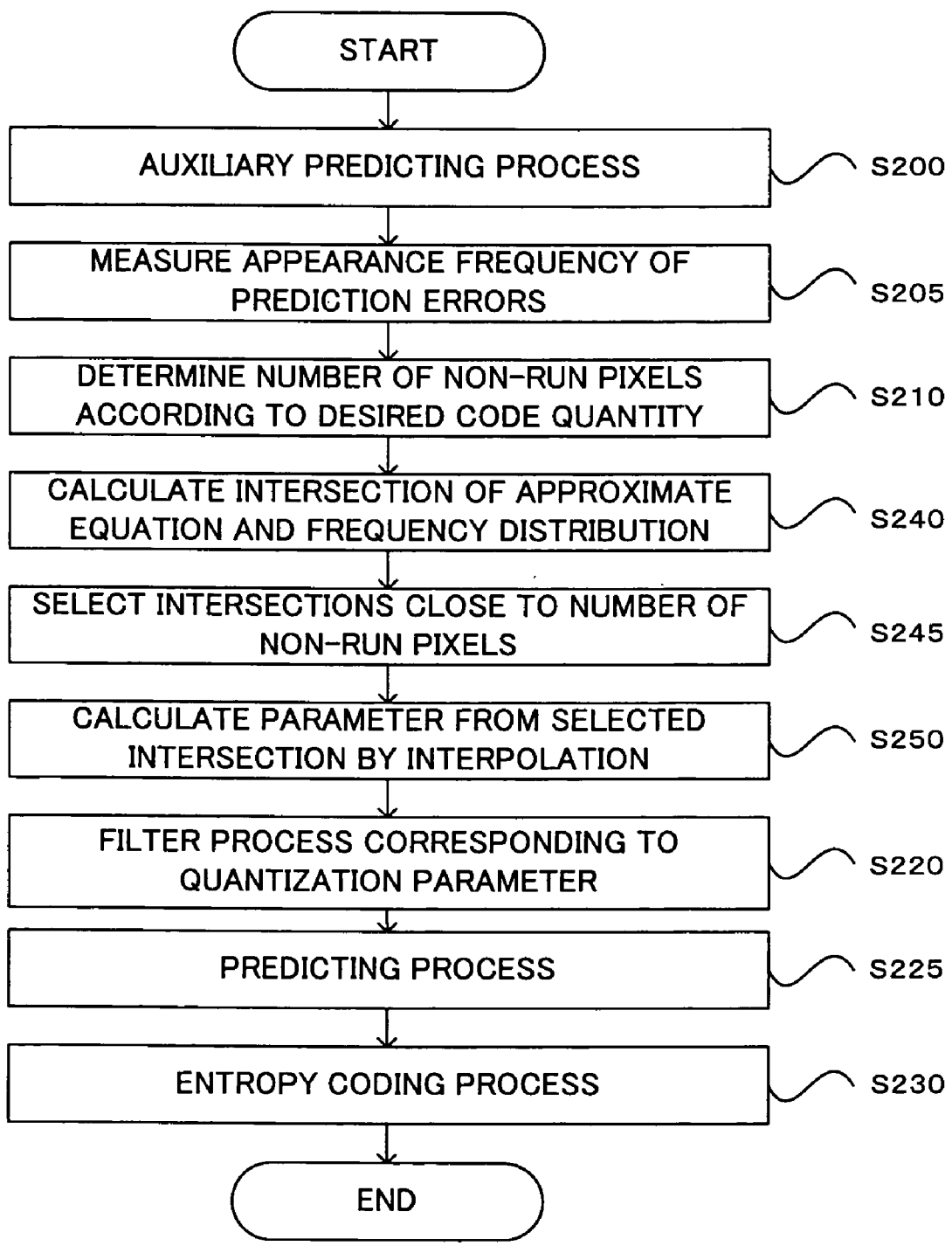
FIG. 19 is a flowchart of a coding process (S24) for calculating the quantization parameter by using an interpolation process.

FIG. 19 is a flowchart of the coding-process (S24) in this modified example. Each process in this figure substantially the same as that in FIG. 15 is identified with the same numeral.

As shown in FIG. 19, at S200, when image data is externally inputted, the auxiliary predicting part 700 (FIG. 18(A)) calculates the prediction error for the inputted image data, and outputs the calculated prediction error to the code quantity evaluating part 710.

At S205, the code quantity evaluating part 710 creates the distribution (FIG. 13) of cumulative appearance frequency of the prediction error inputted from the auxiliary predicting part 700, and outputs the created distribution of cumulative appearance frequency to the quantization controller 724.

At S210, the quantization controller 724 (FIG. 18(A)) calculates the number of non-run pixels n corresponding to the desired code quantity by using the approximate equation of the graph illustrated in FIG. 1(B).

At step 240 (S240), the quantization controller 724 calculates the intersection of the distribution of cumulative appearance frequency inputted from the code quantity evaluating part 710 and the approximate equation retained in the approximate equation retaining part 770.

At step 245 (S245), the quantization controller 724 selects, among the calculated intersections, two intersections that are close to the intersection of the calculated number of non-run pixels n and the distribution of cumulative appearance frequency.

At step 250 (S250), the quantization controller 724 calculates the quantization parameter (allowable error) corresponding to the number of non-run pixels n by the interpolation operation by the selected two intersections, and sets the calculated quantization parameter to the filter processing part 730.

At S220, the filter processing part 730 provides a filter process to the inputted image data by using the allowable error (quantization parameter) set by the quantization controller 724, and outputs the image data that is subject to the filter process to the prediction processing part 740.

At S225, the prediction processing part 740 performs a prediction process to the image data inputted from the filter processing part 730, produces a predicting part ID and its run length and prediction error, and outputs the produced predicting part ID, run length, and a prediction error to the entropy coding part 750 as the symbol.

At S230, the entropy coding part 750 encodes the symbol (predicting part ID, run length, and prediction error) inputted from the prediction processing part 740 with Huffman coding.

As described above, the relationship between the characteristic amounts, which are not dependent on an image, is represented by the approximation, whereby even a non-linear quantization process can be controlled with high precision.

Although this modified example describes the case where the quantization parameter is calculated, the principle of this modified example can be applied to a simple code quantity estimating process.

The foregoing description of the exemplary embodiments of the present invention has been provided for the purposes of illustration and description. It is not intended to be exhaustive or to limit the invention to the precise forms disclosed obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus, comprising:

an intermediate data generating unit that generates intermediate data expressing input data, which is a subject to be coded, in another expression manner;

a code quantity evaluating unit that evaluates a code quantity of generated code data on the basis of a statistical amount of the intermediate data generated by the intermediate data generating unit;

a parameter determining unit that determines a coding parameter for achieving a desired code quantity on the basis of a result of the evaluation by the code quantity evaluating unit;

a lossy processing unit that performs a lossy data processing to the inputted data or intermediate data in accordance with the coding parameter determined by the parameter determining unit; and a coding unit that converts the intermediate data, which is subject to the lossy data processing by the lossy processing unit, into code data.

2. The data processing apparatus according to claim 1, wherein the inputted data is image data, the intermediate data generating unit performs a spatial frequency transformation to the image data to generate a transformed coefficient at each frequency as the intermediate data, and the code quantity evaluating unit evaluates the code quantity of the code data on the basis of the number of the transformed coefficients having a value other than zero, among the transformed coefficients at the respective frequencies.

3. The data processing apparatus according to claim 2, wherein the code quantity evaluating unit calculates the number of transformed coefficients at a quantization interval of an odd multiple, and evaluates the code quantity based upon the calculated number of transformed coefficients.

4. The data processing apparatus according to claim 1, wherein the intermediate data generating unit compares the input data with prediction data of the input data, and generates a result of the comparison as the intermediate data, and the code quantity evaluating unit evaluates the code quantity of the code data on the basis of a degree of agreement between the input data and the prediction data.

5. The data processing apparatus according to claim 4, wherein the intermediate data generating unit generates agreement information indicating that the input data and the prediction data agree with each other, and a prediction error indicating a difference between the input data and the prediction data, as the intermediate data, and the code quantity evaluating unit generates information of a distribution of the prediction error calculated by the intermediate data generating unit.

6. The data processing apparatus according to claim 5, wherein when the difference between the input data and the prediction data is within a fixed allowable range, the coding unit assumes this difference as zero to code the generated intermediate data, and the data processing apparatus further comprising:

an approximate information retaining unit that stores approximate information indicating a relationship between values of the prediction error when a plurality of allowable errors are respectively applied and the information of the distribution of the prediction error as associated with each of the allowable errors; and an allowable error calculating unit that calculates an allowable error, which should be applied, on the basis of the approximate information retained by the approximate information retaining unit and the information of the distribution of the prediction error generated by the code quantity evaluating unit.

7. A data processing method, comprising:

generating intermediate data that expresses input data, which is a subject to be coded, in another expression manner;

evaluating a code quantity of generated code data on the basis of a statistical amount of the generated intermediate data;

determining a coding parameter in accordance with a result of the evaluation;

performing a lossy data processing to the intermediate data in accordance with the determined coding parameter; and converting the intermediate data, which is subject to the lossy data processing, into code data.

8. A computer readable medium storing a program causing a computer to execute a process comprising:

generating intermediate data that expresses input data, which is a subject to be coded, in another expression manner;

evaluating a code quantity of generated code data on the basis of a statistical amount of the generated intermediate data;

determining a coding parameter in accordance with a result of the evaluation;

performing a lossy data processing to the intermediate data in accordance with the determined coding parameter; and converting the intermediate data, which is subject to the lossy data processing, into code data.

9. A computer data signal embodied in a carrier wave for enabling a computer to execute a process comprising:

generating intermediate data that expresses input data, which is a subject to be coded, in another expression manner;

evaluating a code quantity of generated code data on the basis of a statistical amount of the generated intermediate data;

determining a coding parameter in accordance with a result of the evaluation;

performing a lossy data processing to the intermediate data in accordance with the determined coding parameter; and converting the intermediate data, which is subject to the lossy data processing, into code data.

* * * * *